US012619788B2

(12) United States Patent
Yonemura et al.

(10) Patent No.: US 12,619,788 B2
(45) Date of Patent: May 5, 2026

(54) INFORMATION PROCESSING APPARATUS, INFORMATION PROCESSING METHOD, AND NON-TRANSITORY COMPUTER READABLE MEDIUM

(71) Applicant: KABUSHIKI KAISHA TOSHIBA, Tokyo (JP)

(72) Inventors: Tomoko Yonemura, Kawasaki Kanagawa (JP); Tsukasa Omino, Ota Tokyo (JP); Misaki Komatsu, Yokohama Kanagawa (JP); Yoshikazu Hanatani, Komae Tokyo (JP); Yuki Nanjo, Kawasaki Kanagawa (JP)

(73) Assignee: Kabushiki Kaisha Toshiba, Kawasaki Kanagawa (JP)

( * ) Notice: Subject to any disclaimer, the term of this patent is extended or adjusted under 35 U.S.C. 154(b) by 128 days.

(21) Appl. No.: 18/502,226

(22) Filed: Nov. 6, 2023

(65) Prior Publication Data

US 2024/0265148 A1     Aug. 8, 2024

(30) Foreign Application Priority Data

Feb. 3, 2023     (JP) ................................. 2023-015632

(51) Int. Cl.
*G06F 21/64*        (2013.01)
*H04L 9/00*         (2022.01)

(52) U.S. Cl.
CPC ................ *G06F 21/64* (2013.01); *H04L 9/50* (2022.05)

(58) Field of Classification Search
CPC .................................... G06F 21/64; H04L 9/50
See application file for complete search history.

(56) References Cited

U.S. PATENT DOCUMENTS 11,163,899 B2 * 11/2021 Kishi .................. G06F 16/5838
11,627,115 B2    4/2023 Yonemura et al.
(Continued)

FOREIGN PATENT DOCUMENTS

JP        2014-228961 A    12/2014
JP        2020-98972 A     6/2020
(Continued)

OTHER PUBLICATIONS

Japan Patent Office, Office Action in JP App. No. 2023-015632 (Mar. 3, 2026).

*Primary Examiner* — Shin-Hon (Eric) Chen
*Assistant Examiner* — Vladimir I Gavrilenko
(74) *Attorney, Agent, or Firm* — Finnegan, Henderson, Farabow, Garrett & Dunner, LLP

(57)                    ABSTRACT

An information processing apparatus includes processing circuitry configured to specify a first consent record that includes an identifier for a first business operator, which identifies the related party and which is assigned exclusively to the first business operator, and consent of the related party allowing the first business operator to execute a first handling of the data of the related party, and detect a related party identifier corresponding to the identifier for the first business operator included in the first consent record; and searching circuitry configured to search the first storage system for a second consent record that includes consent of the related party allowing a second business operator to execute a second handling of the data, wherein the processing circuitry is configured to generate an audit record including a record identifier that identifies the first consent record and information regarding the presence or absence of the second consent record.

17 Claims, 20 Drawing Sheets

(56)          References Cited

U.S. PATENT DOCUMENTS

| | | | |
|---|---|---|---|
| 2009/0327755 A1* | 12/2009 | Ikeda | G06F 21/62 |
| | | | 711/E12.001 |
| 2020/0153637 A1 | 5/2020 | Sakai et al. | |
| 2020/0211005 A1* | 7/2020 | Bodorik | G06F 9/54 |
| 2020/0313852 A1* | 10/2020 | Cao | G06F 21/6209 |
| 2021/0049303 A1* | 2/2021 | Morita | G06F 16/345 |
| 2021/0083843 A1* | 3/2021 | Salomon | G06F 21/602 |
| 2021/0089517 A1 | 3/2021 | Suga | |
| 2021/0335352 A1* | 10/2021 | Kobayashi | G10L 15/26 |
| 2022/0147651 A1 | 5/2022 | Omino et al. | |
| 2022/0147655 A1 | 5/2022 | Komatsu et al. | |
| 2022/0391351 A1* | 12/2022 | Jimbo | G06F 16/48 |
| 2022/0414195 A1* | 12/2022 | Sakaguchi | G06Q 50/40 |
| 2023/0024635 A1 | 1/2023 | Yasuda | |
| 2023/0078269 A1* | 3/2023 | Takemoto | G06F 21/6245 |
| | | | 726/30 |
| 2023/0088589 A1* | 3/2023 | Kondo | H04L 9/16 |
| | | | 713/150 |
| 2023/0118762 A1* | 4/2023 | Omino | G06F 16/2365 |
| | | | 726/26 |
| 2023/0177207 A1 | 6/2023 | Yonemura et al. | |

FOREIGN PATENT DOCUMENTS

| | | | |
|---|---|---|---|
| JP | 2021-48546 A | 3/2021 | |
| JP | 2022-74414 A | 5/2022 | |
| JP | 2022-75328 A | 5/2022 | |
| JP | 2022-75337 A | 5/2022 | |
| JP | 7090903 B2 | 6/2022 | |
| JP | 2022-183596 A | 12/2022 | |
| JP | 7214000 B2 | 1/2023 | |
| JP | 2023-59719 A | 4/2023 | |
| JP | 2023-85088 A | 6/2023 | |
| WO | WO 2021/124568 A1 | 6/2021 | |

* cited by examiner

FIG. 3

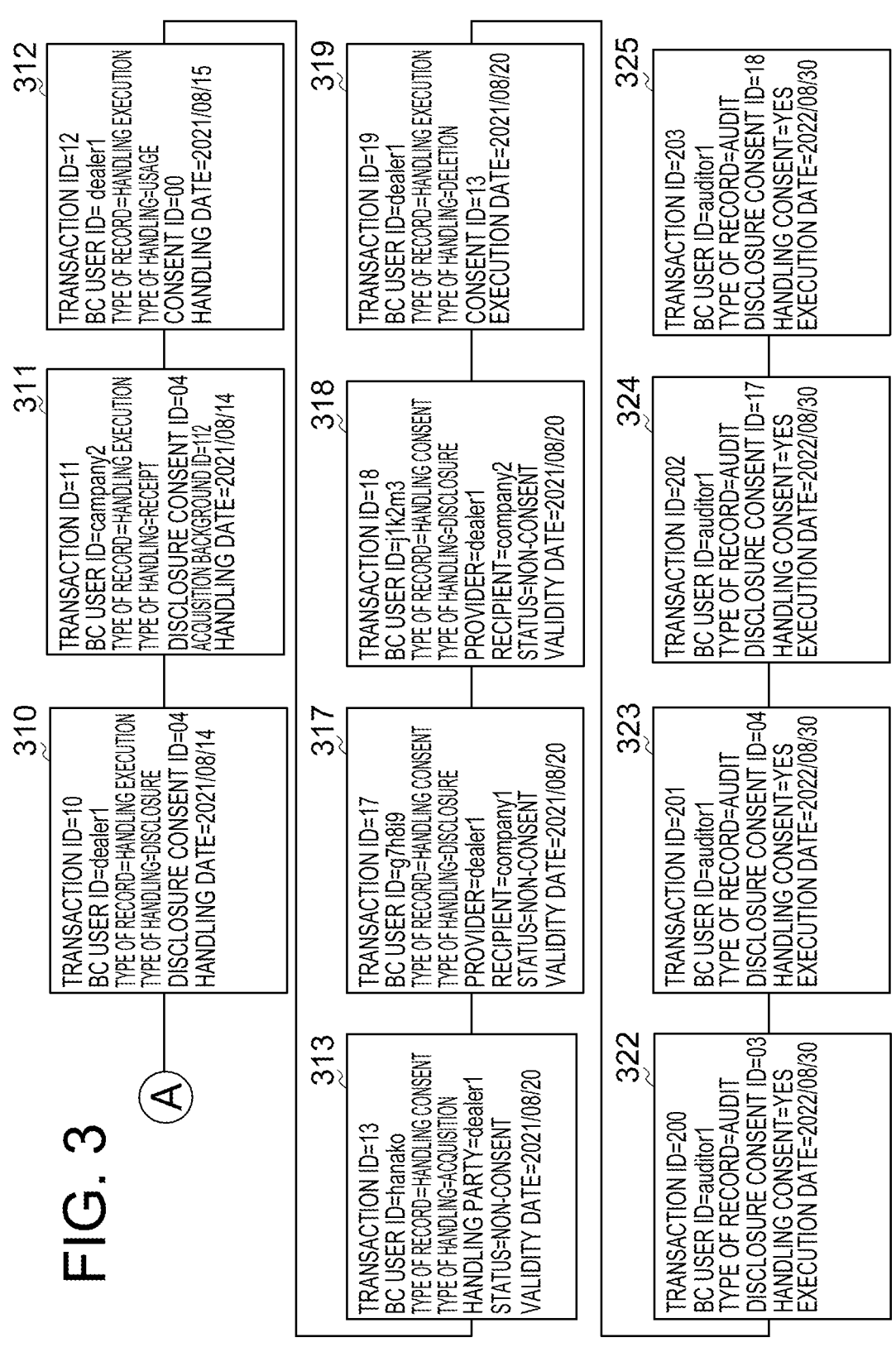

310

TRANSACTION ID=10
BC USER ID=dealer1
TYPE OF RECORD=HANDLING EXECUTION
TYPE OF HANDLING=DISCLOSURE
DISCLOSURE CONSENT ID=04
HANDLING DATE=2021/08/14

311

TRANSACTION ID=11
BC USER ID=company2
TYPE OF RECORD=HANDLING EXECUTION
TYPE OF HANDLING=RECEIPT
DISCLOSURE CONSENT ID=04
ACQUISITION BACKGROUND ID=112
HANDLING DATE=2021/08/14

312

TRANSACTION ID=12
BC USER ID= dealer1
TYPE OF RECORD=HANDLING EXECUTION
TYPE OF HANDLING=USAGE
CONSENT ID=00
HANDLING DATE=2021/08/15

313

TRANSACTION ID=13
BC USER ID=hanako
TYPE OF RECORD=HANDLING CONSENT
TYPE OF HANDLING=ACQUISITION
HANDLING PARTY=dealer1
STATUS=NON-CONSENT
VALIDITY DATE=2021/08/20

317

TRANSACTION ID=17
BC USER ID=g7h8i9
TYPE OF RECORD=HANDLING CONSENT
TYPE OF HANDLING=DISCLOSURE
PROVIDER=dealer1
RECIPIENT=company1
STATUS=NON-CONSENT
VALIDITY DATE=2021/08/20

318

TRANSACTION ID=18
BC USER ID=j1k2m3
TYPE OF RECORD=HANDLING CONSENT
TYPE OF HANDLING=DISCLOSURE
PROVIDER=dealer1
RECIPIENT=company2
STATUS=NON-CONSENT
VALIDITY DATE=2021/08/20

319

TRANSACTION ID=19
BC USER ID=dealer1
TYPE OF RECORD=HANDLING EXECUTION
TYPE OF HANDLING=DELETION
CONSENT ID=13
EXECUTION DATE=2021/08/20

322

TRANSACTION ID=200
BC USER ID=auditor1
TYPE OF RECORD=AUDIT
DISCLOSURE CONSENT ID=03
HANDLING CONSENT=YES
EXECUTION DATE=2022/08/30

323

TRANSACTION ID=201
BC USER ID=auditor1
TYPE OF RECORD=AUDIT
DISCLOSURE CONSENT ID=04
HANDLING CONSENT=YES
EXECUTION DATE=2022/08/30

324

TRANSACTION ID=202
BC USER ID=auditor1
TYPE OF RECORD=AUDIT
DISCLOSURE CONSENT ID=17
HANDLING CONSENT=YES
EXECUTION DATE=2022/08/30

325

TRANSACTION ID=203
BC USER ID=auditor1
TYPE OF RECORD=AUDIT
DISCLOSURE CONSENT ID=18
HANDLING CONSENT=YES
EXECUTION DATE=2022/08/30

A

Figure 6:
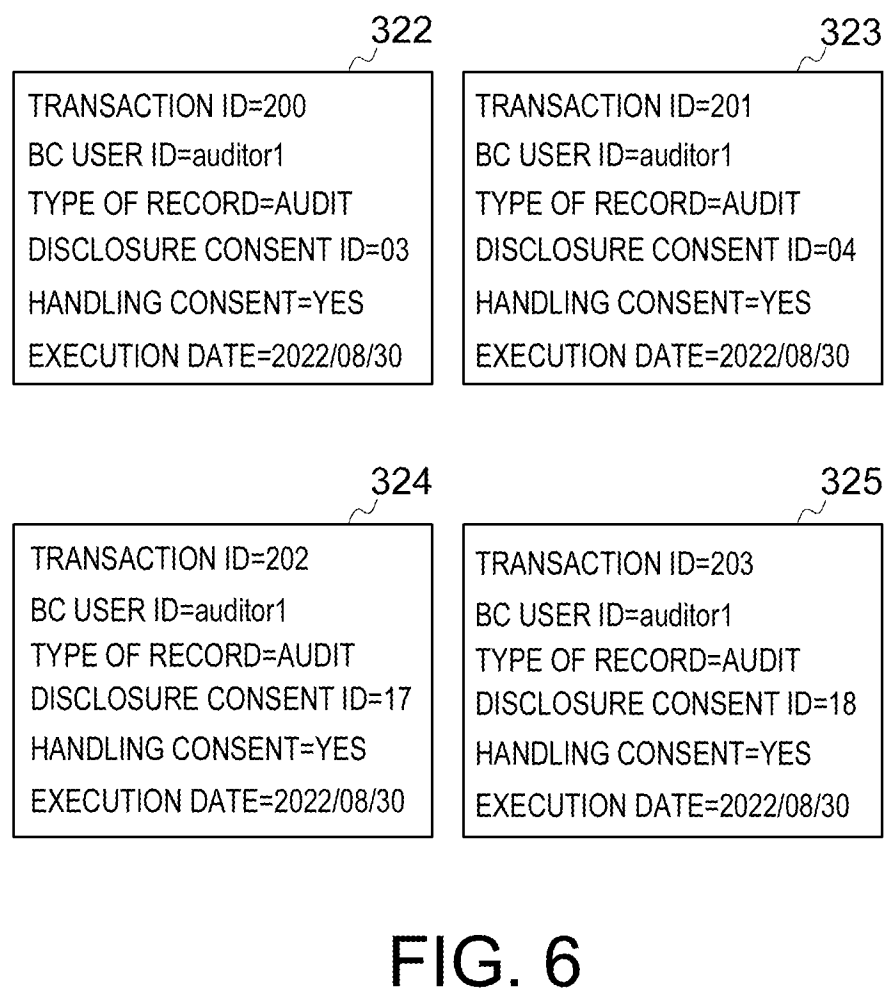

322

TRANSACTION ID=200
BC USER ID=auditor1
TYPE OF RECORD=AUDIT
DISCLOSURE CONSENT ID=03
HANDLING CONSENT=YES
EXECUTION DATE=2022/08/30

323

TRANSACTION ID=201
BC USER ID=auditor1
TYPE OF RECORD=AUDIT
DISCLOSURE CONSENT ID=04
HANDLING CONSENT=YES
EXECUTION DATE=2022/08/30

324

TRANSACTION ID=202
BC USER ID=auditor1
TYPE OF RECORD=AUDIT
DISCLOSURE CONSENT ID=17
HANDLING CONSENT=YES
EXECUTION DATE=2022/08/30

325

TRANSACTION ID=203
BC USER ID=auditor1
TYPE OF RECORD=AUDIT
DISCLOSURE CONSENT ID=18
HANDLING CONSENT=YES
EXECUTION DATE=2022/08/30

TRANSACTION ID=112
BC USER ID=company2
TYPE OF RECORD=ACQUISITION BACKGROUND
HANDLING PARTY=dealer1

320

TRANSACTION ID=111
BC USER ID=company1
TYPE OF RECORD=ACQUISITION BACKGROUND
HANDLING PARTY=dealer1

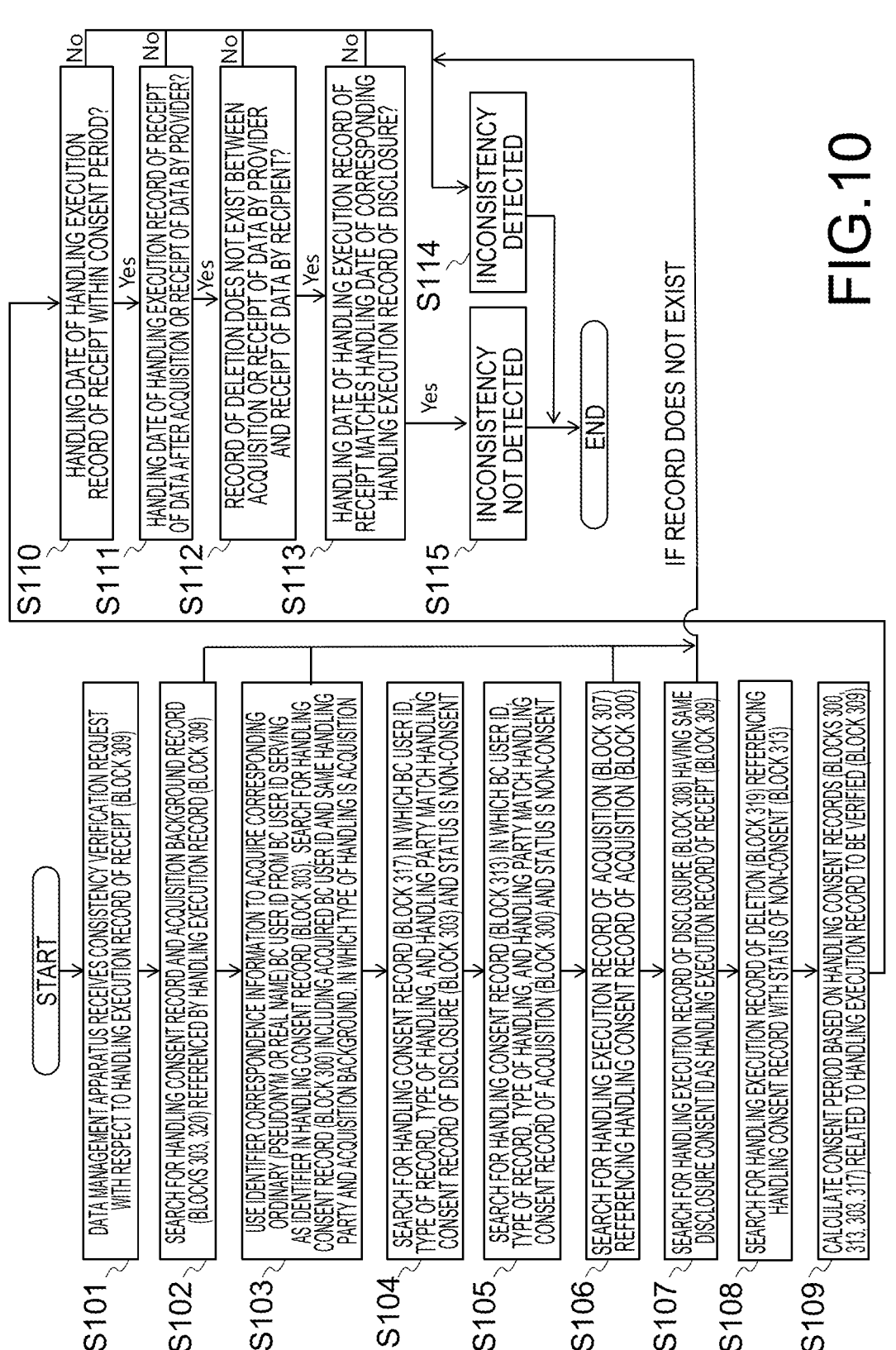

FIG.10

START

S101　DATA MANAGEMENT APPARATUS RECEIVES CONSISTENCY VERIFICATION REQUEST WITH RESPECT TO HANDLING EXECUTION RECORD OF RECEIPT (BLOCK 309)

S102　SEARCH FOR HANDLING CONSENT RECORD AND ACQUISITION BACKGROUND RECORD (BLOCKS 303, 320) REFERENCED BY HANDLING EXECUTION RECORD (BLOCK 309)

S103　USE IDENTIFIER CORRESPONDENCE INFORMATION TO ACQUIRE CORRESPONDING ORDINARY (PSEUDONYM OR REAL NAME) BC USER ID FROM BC USER ID SERVING AS IDENTIFIER IN HANDLING CONSENT RECORD (BLOCK 303). SEARCH FOR HANDLING CONSENT RECORD (BLOCK 300) INCLUDING ACQUIRED BC USER ID AND SAME HANDLING PARTY AND ACQUISITION BACKGROUND, IN WHICH TYPE OF HANDLING IS ACQUISITION

S104　SEARCH FOR HANDLING CONSENT RECORD (BLOCK 317) IN WHICH BC USER ID, TYPE OF RECORD, TYPE OF HANDLING, AND HANDLING PARTY MATCH HANDLING CONSENT RECORD OF DISCLOSURE (BLOCK 303) AND STATUS IS NON-CONSENT

S105　SEARCH FOR HANDLING CONSENT RECORD (BLOCK 313) IN WHICH BC USER ID, TYPE OF RECORD, TYPE OF HANDLING, AND HANDLING PARTY MATCH HANDLING CONSENT RECORD OF ACQUISITION (BLOCK 300) AND STATUS IS NON-CONSENT

S106　SEARCH FOR HANDLING EXECUTION RECORD OF ACQUISITION (BLOCK 300) REFERENCING HANDLING CONSENT RECORD OF ACQUISITION (BLOCK 300)

S107　SEARCH FOR HANDLING EXECUTION RECORD OF DISCLOSURE (BLOCK 308) HAVING SAME DISCLOSURE CONSENT ID AS HANDLING EXECUTION RECORD OF RECEIPT (BLOCK 309)

S108　SEARCH FOR HANDLING EXECUTION RECORD OF DELETION (BLOCK 319) REFERENCING HANDLING CONSENT RECORD WITH STATUS OF NON-CONSENT (BLOCK 313)

S109　CALCULATE CONSENT PERIOD BASED ON HANDLING CONSENT RECORDS (BLOCKS 300, 313, 303, 317) RELATED TO HANDLING EXECUTION RECORD TO BE VERIFIED (BLOCK 309)

S110　HANDLING DATE OF HANDLING EXECUTION RECORD OF RECEIPT WITHIN CONSENT PERIOD?
No
Yes

S111　HANDLING DATE OF HANDLING EXECUTION RECORD OF RECEIPT OF DATA AFTER ACQUISITION OR RECEIPT OF DATA BY PROVIDER?
No
Yes

S112　RECORD OF DELETION DOES NOT EXIST BETWEEN ACQUISITION OR RECEIPT OF DATA BY PROVIDER AND RECEIPT OF DATA BY RECIPIENT?
No
Yes

S113　HANDLING DATE OF HANDLING EXECUTION RECORD OF RECEIPT MATCHES HANDLING DATE OF CORRESPONDING HANDLING EXECUTION RECORD OF DISCLOSURE?
No
Yes

S114　INCONSISTENCY DETECTED

S115　INCONSISTENCY NOT DETECTED

END

IF RECORD DOES NOT EXIST

DATA ACCESS LOG 4-1

| # | TYPE | BUSINESS OPERATOR OF RECORD | ACCESS DESTINATION | DATE/TIME |
|---|------|------------------------------|--------------------|-----------|
| 1 | WRITE | dealer1 | hanako | 2021/08/13 |
| 2 | READ | dealer1 | hanako | 2021/08/14 |
| 3 | READ | dealer1 | hanako | 2021/08/14 |
| 4 | READ | dealer1 | hanako | 2021/08/15 |
| 5 | DELETE | dealer1 | hanako | 2020/08/20 |

FIG.16

COMMUNICATION LOG 4-2

| # | SENDING PARTY | RECEIVING PARTY | CONTENT | DATE/TIME |
|---|---|---|---|---|
| 1 | hanako | delaer1 | ACQUISITION, dealer1, CONSENT | 2021/08/11 |
| 2 | hanako | dealer1 | DISCLOSURE, dealer1, company1, CONSENT | 2021/08/12 |
| 3 | hanako | dealer1 | DISCLOSURE, dealer1, company2, CONSENT | 2021/08/12 |
| 4 | hanako | dealer1 | hanako | 2021/08/13 |
| 5 | dealer1 | company1 | g7h8i9 | 2021/08/14 |
| 6 | dealer1 | company2 | J1k2m3 | 2021/08/14 |
| 7 | hanako | dealer1 | ACQUISITION, dealer1, NON-CONSENT | 2021/08/20 |
| 8 | auditor1 | dealer1 | AUDIT, 03, YES | 2022/08/30 |
| 9 | auditor1 | dealer1 | AUDIT, 04, YES | 2022/08/30 |
| 10 | auditor1 | dealer1 | AUDIT, 17, YES | 2022/08/30 |
| 11 | auditor1 | dealer1 | AUDIT, 18, YES | 2022/08/30 |

FIG.17

AUTHENTICATION LOG 4-4

| # | RELATED PARTY | CONTENT | DATE/TIME |
|---|---|---|---|
| 1 | hanako | AUTHENTICATION SUCCESSFUL | 2021/08/11 |
| 2 | hanako | AUTHENTICATION SUCCESSFUL | 2021/08/12 |
| 3 | hanako | AUTHENTICATION SUCCESSFUL | 2021/08/13 |
| 4 | hanako | AUTHENTICATION SUCCESSFUL | 2021/08/20 |
| 5 | auditor1 | AUTHENTICATION SUCCESSFUL | 2022/08/30 |

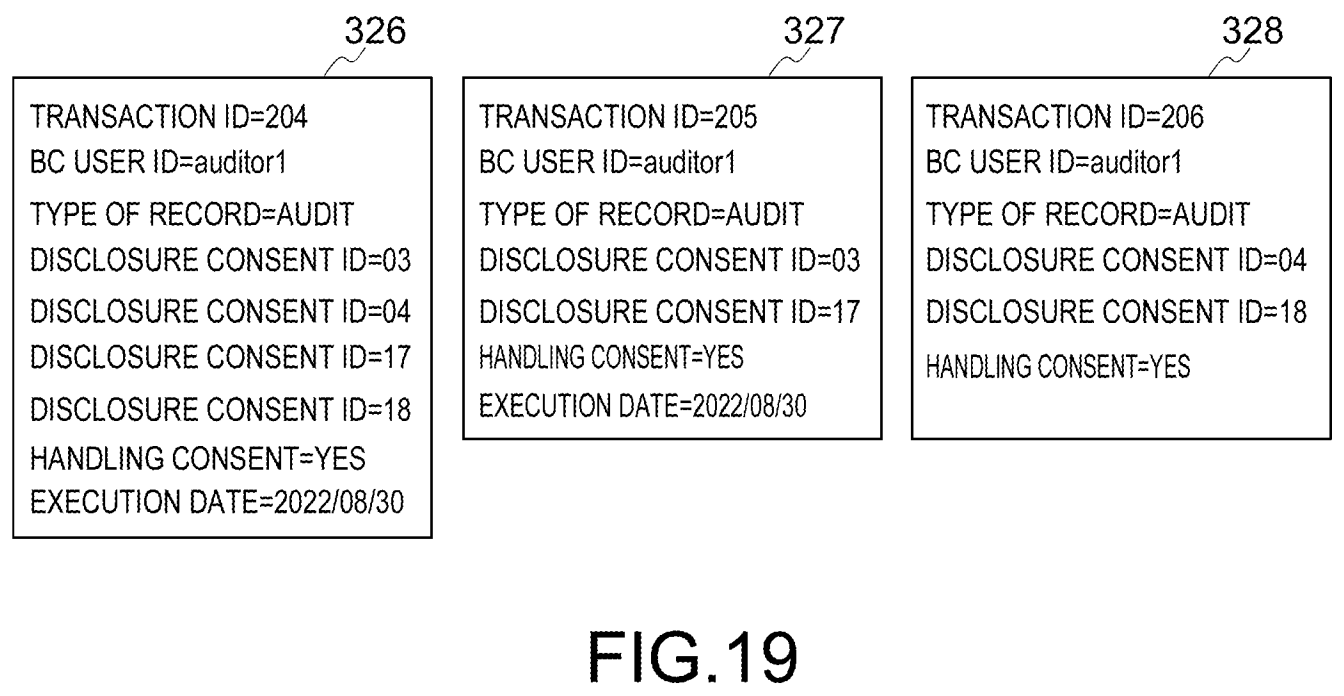

TRANSACTION ID=204
BC USER ID=auditor1
TYPE OF RECORD=AUDIT
DISCLOSURE CONSENT ID=03
DISCLOSURE CONSENT ID=04
DISCLOSURE CONSENT ID=17
DISCLOSURE CONSENT ID=18
HANDLING CONSENT=YES
EXECUTION DATE=2022/08/30

327

TRANSACTION ID=205
BC USER ID=auditor1
TYPE OF RECORD=AUDIT
DISCLOSURE CONSENT ID=03
DISCLOSURE CONSENT ID=17
HANDLING CONSENT=YES
EXECUTION DATE=2022/08/30

328

TRANSACTION ID=206
BC USER ID=auditor1
TYPE OF RECORD=AUDIT
DISCLOSURE CONSENT ID=04
DISCLOSURE CONSENT ID=18
HANDLING CONSENT=YES

FIG.19

INFORMATION PROCESSING APPARATUS, INFORMATION PROCESSING METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2023-015632, filed on Feb. 3, 2023, the entire contents of which are incorporated herein by reference.

FIELD

Embodiments herein relate generally to an information processing apparatus, an information processing method, and a non-transitory computer readable medium.

BACKGROUND

According to the law related to the protection of personal information (hereinafter, Act on the Protection of Personal Information), in the acquisition, use, and the like of sensitive personal information, a business handling personal information is requested to acquire consent in advance from the person in question, that is, the owner of the personal data. The consent concerns the purpose of use, the disclosure of personal data to a third party, and the receipt of personal data from a third party. For example, the business handling personal information creates a record related to the consent. When executing a process requiring the consent of the owner, the business handling personal information confirms the existence or non-existence of the consent on the basis of the record.

To make the flow of the disclosure of personal data traceable, when providing personal data to a third party, the business handling personal information is requested to make a record related to the disclosure and retain the record for a certain period. For example, the business handling personal information records an indication that personal data has been provided, together with information such as the name of the owner, the consent of the owner, the category of personal data, and the name of the recipient third party. The third party business handling personal information receiving the personal data is requested to check the background by which the providing business handling personal information acquired the provided personal data, make a record of receiving the personal data, and retain the record for a certain period. For example, the third party provided with the personal data, or in other words, the business operator to act as the party using the personal data, checks the name of the business handling personal information from which the data was provided and the background by which the providing personal information handling business operator acquired the provided personal data, and makes a record of receiving the personal data together with the checked information.

To enable verification of processing performed on personal data, a business handling personal information creates records other than a record related to disclosure (disclosure record) and a record related to receipt (receipt record). For example, a business handling personal information creates a record related to the acquisition of personal data (acquisition record), a record related to generation (for example, processing personal data to generate data), and a record related to deletion (deletion record), and retains the records for a certain period. These records are collectively referred to as records related to processing. Acquisition is taken to mean the acquisition (primary acquisition) of personal data from the owner of personal data or a representative, and receipt is taken to mean the acquisition (secondary acquisition) of personal data from the party who acquired the personal data from the individual or representative. However, acquisition and receipt may also be unified into either one, or another expression may be used.

When personal data is provided to multiple third parties, an identifier of the owner to be included in a record related to consent is changed to a different identifier that uniquely corresponds to each third party and stored, for example. This allows for checking owner consent to the disclosure of personal data to the third parties and a history of disclosure to the third parties, while also reducing disadvantages that may occur in the event of a personal data leak (the collation of leaked personal data with other data). When a record related to consent before a change and a record related to consent after the change are both stored, a party with access to both records related to consent before and after the change can see from the agreement of items in the records related to consent that the set of identifiers before the change and the set of identifiers after the change correspond as the set of a user (owner) who has consented to the disclosure of personal data to a certain third party. As a result, this could lead to the leaking of a correspondence table of the identifiers before and after the change. Moreover, storing both records related to consent before and after the change could put pressure on storage system capacity.

BRIEF DESCRIPTION OF THE DRAWINGS

FIG. 3 is a continuation of FIG. 2;

FIG. 6 is a diagram illustrating the retrieval of blocks of audit records in FIGS. 2 and 3;

FIG. 10 is a flowchart of one example of operations in Verification Example 1;

FIG. 16 is a diagram illustrating an example of a data access log;

FIG. 17 is a diagram illustrating an example of a communication log;

FIG. 18 is a diagram illustrating an example of an authentication log;

FIG. 19 is a diagram illustrating variations of an audit record; and

DETAILED DESCRIPTION

According to one embodiment, an information processing apparatus includes: a processing circuitry and a searching circuitry.

The processing circuitry specifies, from among records stored in a first storage system storing at least one of records related to handling of the data of a related party and records related to consent to the handling of the data, a first consent record that includes an identifier for a first business operator, which identifies the related party and which is assigned exclusively to the first business operator, and consent of the related party allowing the first business operator to execute a first handling of the data of the related party The processing circuitry detects a related party identifier corresponding to the identifier for the first business operator included in the first consent record, on the basis of correspondence data in which a related party identifier, which identifies the related party and which has a different value from the identifier for the first business operator, is associated with the identifier for the first business operator.

The searching circuitry searches the first storage system, on the basis of the related party identifier, for a second consent record that includes consent of the related party allowing a second business operator to execute a second handling of the data.

The first handling and the second handling are related such that the execution of the second handling of the data by the second business operator enables the execution of the first handling of the data by the first business operator.

The processing circuitry generates, on the basis of a result of the search for the second consent record, an audit record to be stored in the first storage system, the audit record including a record identifier that identifies the first consent record and information regarding the presence or absence of the second consent record.

Hereinafter, embodiments will be described with reference to the drawings.

First Embodiment

Figure 1:
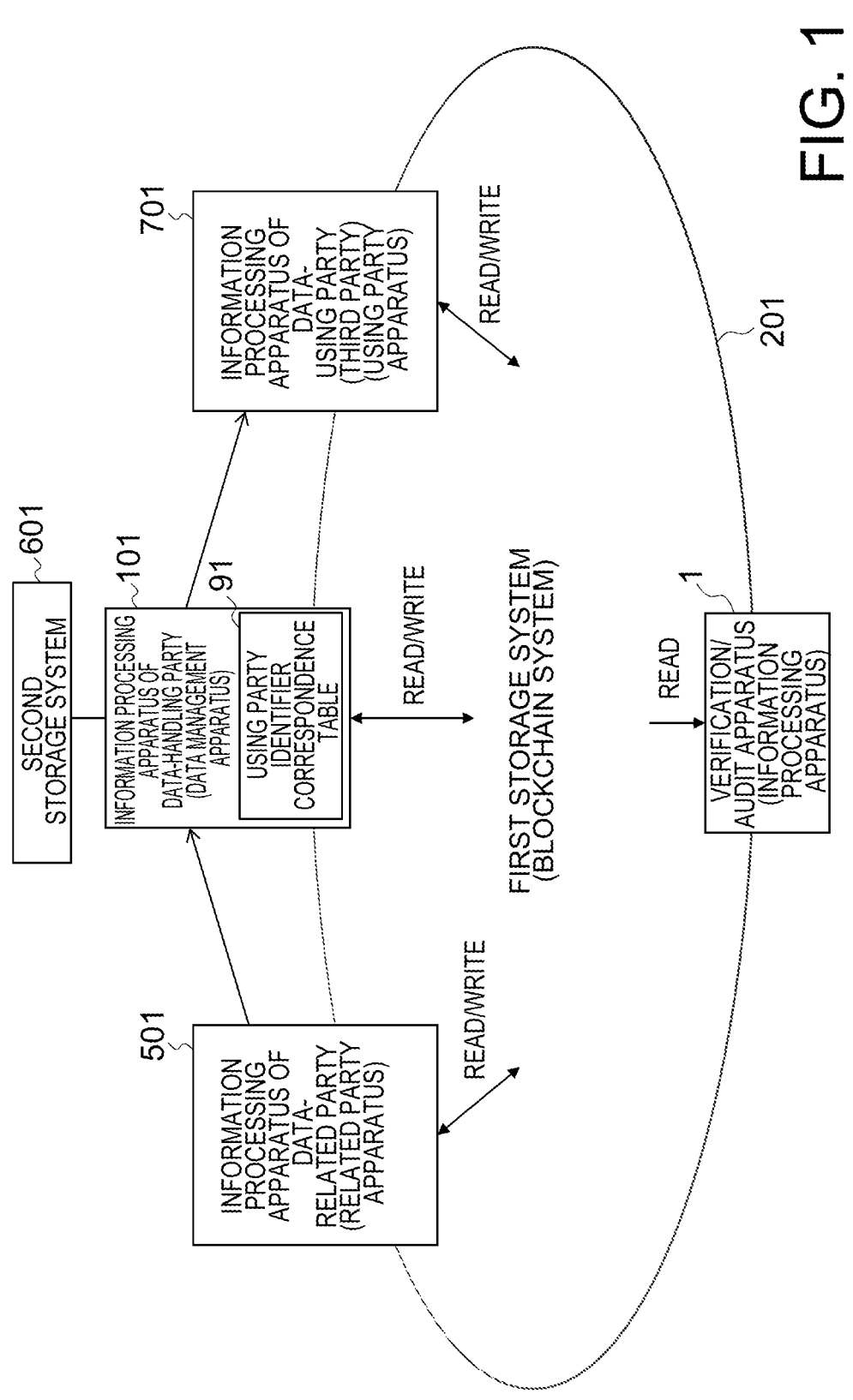
FIG. 1 is a block diagram illustrating an example of a data management system that is an information processing system according to an embodiment.

FIG. 1 is a block diagram illustrating an example of a data management system that is an information processing system according to an embodiment.

Figure 9:
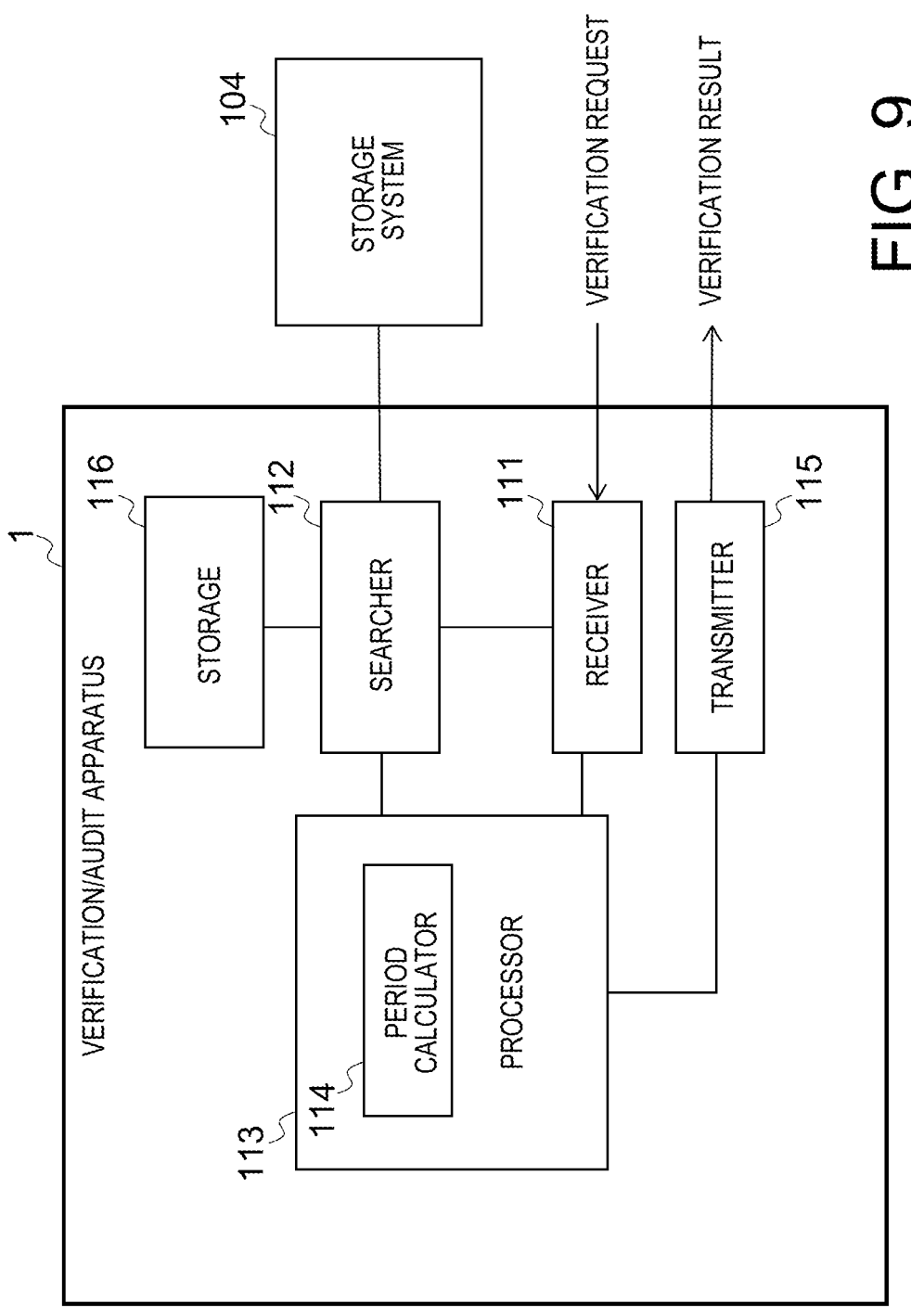
FIG. 9 is a block diagram of a verification/audit apparatus.

The information processing system according to the present embodiment is provided with a related party apparatus 501, a data management apparatus 101, a using party apparatus 701, a first storage system 201 (in this example, a blockchain system), and a verification/audit apparatus 1. The related party apparatus 501 is an information processing apparatus of a data-related party (for example, the owner of data). The data management apparatus 101 is an information processing apparatus of a data-handling party (second business operator). The using party apparatus 701 is an information processing apparatus of a data-using party (first business operator), a third party that is neither the data-related party nor the data-handling party. The verification/audit apparatus 1 is an information processing apparatus that verifies various records written to the blockchain system 201 and generates audit records. A block diagram of the verification/audit apparatus 1 is illustrated in FIG. 9 described later.

In FIG. 1, the verification/audit apparatus 1 is illustrated as a separate apparatus from the related party apparatus 501, the data management apparatus 101, and the using party apparatus 701. However, the verification/audit apparatus 1 may also be the same apparatus as at least one of the related party apparatus 501, the data management apparatus 101, and the using party apparatus 701.

The data management apparatus 101 is connected to a second storage system 601 storing logs (such as a data access log, communication log, and authentication log described later) of various operations performed in the data management apparatus 101. The data management apparatus 101 is provided with a using party identifier correspondence table 91 (hereinafter, the correspondence table 91 or correspondence data) described later. Note that the related party apparatus 501, the data management apparatus 101, and the using party apparatus 701 are not limited to a single apparatus each, and a plurality of each apparatus may exist. In the information processing system according to the present embodiment, the data management apparatus 101 handles data (personal data) of the data-related party (data owner). Although a variety of types of handling are anticipated, one type of handling is that the data management apparatus 101 may transmit the data to the using party apparatus 701. In other words, the data-handling party may provide the data of the data-related party to a third party, namely the data-using party. For example, the business handling personal information (PDS business) that manages a personal data store (PDS) retaining personal data is the data-handling party, and the PDS business conceivably provides personal data to third parties after acquiring consent from the person in question or a representative. Note that in the case where the data-handling party acquires data from the data-related party and provides the data to the data-using party, the data-handling party may be considered to be a first recipient of the data, and the data-using party may be considered to be a second recipient of the data. Note that the data-related party, the data-handling party, and the data-using party are not limited to specific persons, and may be individuals or corporations. Also, the data-related party simply means the person associated with the data, and is not limited to a specific person. For example, the data-related party may be a consenting party that consents to the handling of data by the data-handling party, a holder of the data, or a representative of the holder. In addition, the data-related party may also be a person specified by the data. For example, the data indicates information such as address, gender, and age, and a person specified by the address or the like may be treated as the data-related party. In this way, the data-related party is anticipated to be a party related to consent with respect to the data or to the data itself.

Furthermore, the type of data handled in the present embodiment, the method of transmitting and receiving data, and the like are not limited to a specific type or method. For example, the data in question may be personal data or industrial data.

Also, in the present embodiment, a log with respect to the data is written to a blockchain provided by the blockchain system 201. The granting of consent to the handling of data, the execution of the handling, the usability of the data as a result of executing the handling, and the like are written as records to the blockchain. For example, the consenting to the disclosure of data, the disclosure of the data to a third party, and actions such as acquiring, receiving, analyzing, editing, or erasing the data may be written to the blockchain. In the present embodiment, data acquisition means that the data-handling party acquires data from the data-related party, and data receipt means that the data-using party acquires data from the data-handling party, but acquisition and receipt are not limited to these meanings. Acquisition and receipt may also be unified into either one.

By leaving such a record with respect to the data, the traceability of the data is secured. For example, in the case where the data is provided to a third party, the data-related party is able to check which using party was provided with the data and the consent used as the basis for providing the data. Also, by managing the record with the blockchain, resistance against tampering with the record can be improved.

The blockchain is managed in a distributed manner by information processing apparatuses belonging to a P2P network associated with the blockchain. The P2P network may also be considered to be a network for consensus-forming with respect to the content written to blocks in the blockchain. It is sufficient for the related party apparatus 501, the data management apparatus 101, and the using party apparatus 701 to be capable of writing a record related to data to the blockchain, either directly or indirectly. In other words, the related party apparatus 501, the data management apparatus 101, and the using party apparatus 701 may belong to the blockchain system 201, or in other words the P2P network associated with the blockchain, and write to blocks in the blockchain directly. Alternatively, the related party apparatus 501, the data management apparatus 101, and the using party apparatus 701 may not belong to the blockchain system 201, and may request an information processing apparatus belonging to the blockchain system 201 to write the record to the blockchain. In other words, writing to the blockchain may also be achieved indirectly by sending the desired record to be written to an information processing apparatus belonging to the blockchain.

In addition, the related party apparatus 501, the data management apparatus 101, and the using party apparatus 701 may write to blocks in the blockchain individually, or one of the apparatuses may write to blocks in the blockchain as a representative. For example, by causing the related party apparatus 501 to write a record related to consent to a block in the blockchain and causing the data management apparatus 101 to monitor the blockchain, the consent may be recognized. Alternatively, the data management apparatus 101 may acquire information indicating consent from the related party apparatus 501 through a medium other than the blockchain, such as email or a web page for example, and write a record related to the consent to a block in the blockchain on the basis of the information.

Note that the method of writing to the blockchain may use known technology, and is not described in detail in the present embodiment. For example, a digital signature may be attached to a written record to indicate security. The digital signature may be generated from a private key of the related party apparatus 501 or from a private key of the data management apparatus 101. Additionally, because managing private keys securely is relatively difficult for the data-related party, the management of private keys may be entrusted to the data-handling party in some cases. Consequently, the data management apparatus 101 may also generate a digital signature from a private key of the related party apparatus 501 instead of the related party apparatus 501, and transmit the generated digital signature to the related party apparatus 501.

The verification/audit apparatus 1 receives from another apparatus a verification request regarding the consistency of any record written to the blockchain, searches the blockchain for the record on the basis of the verification request, and verifies the consistency of the record. The requester apparatus that issues the verification request may be the related party apparatus 501, the data management apparatus 101, the using party apparatus 701, or an apparatus different from the above. The verification/audit apparatus 1 may also not belong to the blockchain system 201 and request an information processing apparatus belonging to the blockchain system 201 to search the blockchain. In FIG. 1, the verification/audit apparatus 1 is illustrated as a separate apparatus from the related party apparatus 501, the data management apparatus 101, and the using party apparatus 701, but at least one of the related party apparatus 501, the data management apparatus 101, and the using party apparatus 701 may also serve as the verification/audit apparatus 1. The verification/audit apparatus 1 is also provided with the functionality of an apparatus (auditor apparatus) of an auditor described later, and generates audit records.

Note that the acting parties taking part in the information processing system are not limited to the acting parties illustrated in FIG. 1, and other acting parties may also exist. For example, it is also anticipated that the data of the related party may also be retained by a data-managing party different from the data-handling party. In this case, it is sufficient for the information processing apparatus of the data-managing party to acquire the data from the related party apparatus 501, and for the information processing apparatus of the data-managing party to transmit the data to the using party apparatus 701 according to an instruction received from the data management apparatus 101. In other words, the information processing apparatus of the data-managing party may function as a part of the data management apparatus 101.

Figure 2:
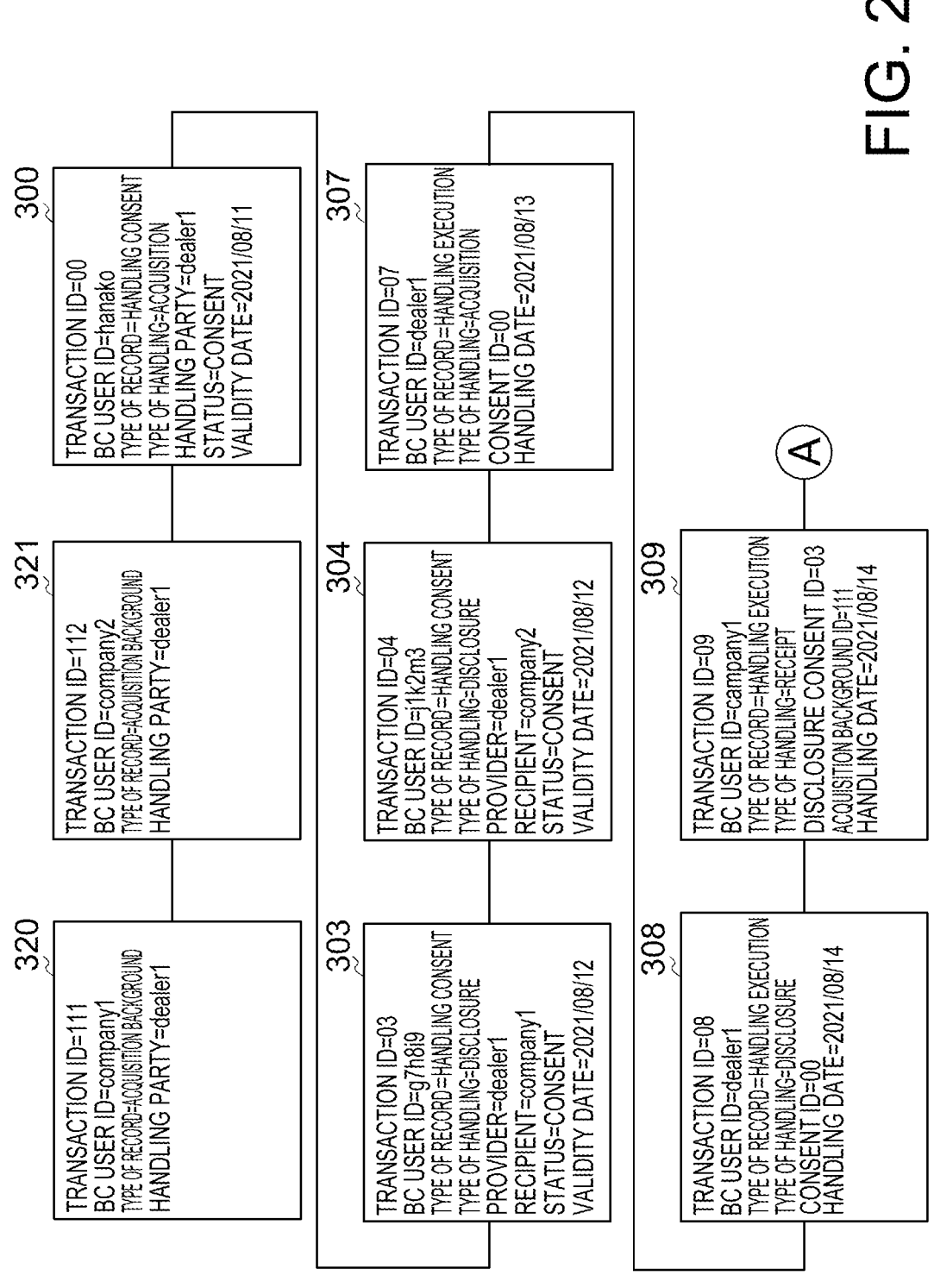
FIG. 2 is a diagram illustrating an example of a blockchain generated by a process according to the present embodiment.

FIG. 2 is a diagram illustrating an example of a blockchain according to the present embodiment. FIG. 3 is a continuation of FIG. 2. Hereinafter, the blockchain in FIGS. 2 and 3 will be described.

FIGS. 2 and 3 illustrate a blockchain including a plurality of blocks. Records related to data, or more precisely, records related to the handling of data, are written to the blockchain. A transaction ID indicated in each block is an identifier of the process (transaction) indicated by each record. The transaction ID is merely a value identifying each block, and the order of values by magnitude does not necessarily match the order in which blocks are generated. Transaction IDs are not necessarily consecutive values. A BC user ID indicated in each block means a user ID for the blockchain, and indicates the acting party of the process indicated by each record.

The block 300 indicates a record (handling consent record) in which the data-related party with the BC user ID "hanako" has consented to the handling of data acquisition by the data-handling party with the BC user ID "dealer1". The consent is valid from Aug. 11, 2021. The type of handling is "acquisition", and the type of record is "handling consent". Also, the status is "consent". Here, "hanako" may be a real name or a pseudonym. The present embodiment assumes that a pseudonym is used.

In the present embodiment, data acquisition may include the retention of acquired data. In other words, consenting to data acquisition also means consenting to the retention of acquired data. However, data acquisition and the retention of acquired data may also be defined separately as different types of handling.

The block 303 also indicates a handling consent record. The block 303 indicates that "g7h8i9", which corresponds to "hanako", has given consent related to disclosure such that data may be provided if the data provider is "dealer1" and the data recipient is the data-using party with the BC user ID "company1". This may also be considered to be a user consent to data receipt by "company1". In this record, the type of handling is "disclosure", and the type of record is "handling consent". A record related to such consent is referred to as disclosure consent. Similarly, the block 304 indicates that "j1k2m3", which corresponds to "hanako", has given consent such that data may be disclosed if the data provider is "dealer1" and the data-using party is "company2". This may also be considered to be user consent to data receipt by "company2". Like the block 301, the type of handling is "disclosure", and the type of record is "handling consent" (disclosure consent).

The BC user IDs illustrated in the blocks 303 and 304 are assigned different values for each using party (recipient) as an identifier identifying the data-related party to the using party. In other words, the BC user IDs are set to identifiers which identify the related party and which are exclusive to each using party. That is, the data-related party "hanako" is expressed by a different identifier depending on the using party. Even if the using party is the same, the identifier is different depending on the related party that the using party is combined with. The correspondence between the BC user ID "hanako" (related party identifier), which indicates a pseudonym (or the actual name) of the user, and the user identifiers "g7h8i9" and "j1k2m3" (first business operator identifiers) exclusive to each using party are stored in the using party identifier correspondence table 91 (correspondence data). Note that in the present embodiment, the user consent allowing "dealer1" to provide data to "company1" and "company2" is considered to include user consent allowing "company1" and "company2" to receive the data. This configuration saves space in the storage system used, because it is not necessary to keep receipt consent and disclosure consent redundantly. However, it is also possible to keep the consent to receipt by "company1" and "company2" redundantly with the disclosure consent.

The block 307 is a handling execution record related to data acquisition. The record indicates that the acting party of acquisition is "dealer1", and that data acquisition occurred on Aug. 13, 2021. The type of record is "handling execution", and the type of handling is "acquisition". A handling execution record for which the type of handling is "acquisition" may also be referred to as a "handling execution record related to acquisition", a "handling execution record for acquisition", an "acquisition record", or the like.

The block 308 is a handling execution record related to data disclosure by "dealer1". The type of record is "handling execution", and the type of handling is "disclosure". The recipient of the data is known to be "company1" from the recipient of the consent ID 03 that is referenced. A handling execution record for which the type of handling is "disclosure" may also be referred to as a "handling execution record related to disclosure", a "handling execution record for disclosure", a "disclosure record", or the like.

The block 309 is a handling execution record related to data receipt by "company1", which corresponds to a data disclosure by "dealer1". The party that provides the data is known to be "dealer1" from the provider of the disclosure consent ID 03 that is referenced. The type of record is "handling execution", and the type of handling is "receipt". A handling execution record for which the type of handling is "receipt" may also be referred to as a "handling execution record related to receipt", a "handling execution record for receipt", a "receipt record", or the like. The present embodiment does not adopt a mechanism for referencing the acquisition consent ID 00 to confirm whether "dealer1" has acquisition consent. The reason is that adopting a mechanism for referencing the acquisition consent ID 00 would make it possible to know or infer that "hanako" corresponds to "g7h8i9" from the correspondence relationship of items between the blocks 300 and 303. In the present embodiment, as described later, confirming that the acquisition background of "dealer1" are legitimate involves referencing an acquisition background record (block 320) of the ID 111 or referencing an audit record (block 322) of the ID 200.

The acquisition background record of the block 320 indicates that the background of data acquisition by "dealer1" are legitimate if the BC user "company1" receives data from "dealer1".

Similarly, the block 310 is a handling execution record (disclosure record) related to data disclosure by "dealer1" to "company1", and the block 311 is a handling execution record (receipt record) related to data receipt by "company2" corresponding to the data disclosure by "dealer1". The blocks 310 and 311 contain content similar to the blocks 308 and 309, respectively, but information such as the disclosure consent ID and the acquisition background ID is different compared to the blocks 308 and 309. In the present embodiment, as described later, confirming that the acquisition background of "dealer1" are legitimate involves referencing an acquisition background record (block 321) of the ID 112 or referencing an audit record (block 323) of the ID 201.

The acquisition background record of the block 321 indicates that the background of data acquisition by "dealer1" are legitimate if the BC user "company2" receives data from "dealer1".

The block 312 is a handling execution record expressing the usage of data by "dealer1". The type of record is "handling execution", and the type of handling is "usage". Such a record related to handling is referred to as a usage record. The related party (owner) of the data is the BC user ID "hanako" of the consent ID 00 that is referenced. Note that although "dealer1" corresponds to the data-handling party (see FIG. 1), the usage of data can be carried out by not only the data-using party but also the data-handling party. In other words, the data-handling party may also be the data-using party. Consent to the acquisition of data doubles as consent to the usage of the data.

The block 313 indicates a record (handling consent record) in which the data-related party with the BC user ID "hanako" has rescinded consent to the acquisition of data by the data-handling party "dealer1". In the block 313, the status is "non-consent".

The block 317 indicates a record (handling consent record) in which the data-related party with the BC user ID "g7h8i9", which corresponds to "hanako", has rescinded handling consent to the disclosure of data by "dealer1" to "company1". The BC user ID indicated in the block 317 is an ID exclusive to the using party, and is an identifier that identifies the data-related party and uniquely corresponds to the using party.

The block 318 indicates a record (handling consent record) in which the data-related party with the BC user ID "j1k2m3", which corresponds to "hanako", has rescinded handling consent to the disclosure of data from "dealer1" to "company2". The BC user ID indicated in the block 318 is an ID exclusive to the using party, and is an identifier that identifies the data-related party and uniquely corresponds to the using party.

As described above, in the present embodiment, a receipt consent and a disclosure content are not kept redundantly in relation to consent. Likewise, by not keeping each of the rescindment of receipt consent and the rescindment of disclosure consent redundantly with respect to the rescindment of consent, space can be saved in the storage system used.

The block 319 is a handling execution record (deletion record) expressing that "dealer1" has deleted data. The related party of the deleted data is "hanako", which is indicated by the BC user ID in the block 313 of the consent ID (transaction ID) 13 that is referenced.

The blocks 322 and 323 are blocks of audit records. The audit record in the block 322 indicates the existence of a consent record (block 300) indicating that the data provider "dealer1" indicated in the consent record of disclosure consent in the block 303 indicated by the disclosure consent ID 03 has acquired consent to the acquisition of data. The audit record in the block 323 indicates the existence of a consent record (block 300) indicating that the data provider "dealer1" indicated in the consent record of disclosure consent in the block 304 indicated by the disclosure consent ID 04 has acquired consent to the acquisition of data. Details of the blocks 322 and 323 will be described later.

The blocks 324 and 325 are blocks of audit records. The audit record in the block 324 indicates the existence of a consent record (block 313) indicating that the data provider "dealer1" in the consent record of rescindment (non-consent) of disclosure consent indicated by the block 317 of the disclosure consent ID 17 has acquired a rescindment of consent to acquisition (non-consent to acquisition) of data. The audit record in the block 325 indicates the existence of a consent record (block 313) indicating that the data provider "dealer1" in the consent record of rescindment (non-consent) of disclosure consent indicated by the block 318 of the disclosure consent ID 18 has acquired a rescindment of consent to acquisition (non-consent to acquisition) of data. Details of the blocks 324 and 325 will be described later.

Note that various information may be included in a record written to the blockchain. For example, a handling consent record related to acquisition (block 300, for instance) may include from where the handling party will acquire the data, or in other words, the source of the data. Also, a handling execution record related to acquisition (block 307, for instance) may include from where the handling party acquired the data, or in other words, the source of the data. As another example, in some cases, a handling consent record related to disclosure (for instance, block 308) may include an indication that all of the data may be provided, or include information such as data categories indicating which portions of the data may be provided. Also, in these handling consent records and handling execution records, the recipient of the data may be included explicitly, or the recipient of the data may be omitted if the recipient of the data can be ascertained by referencing another record as described above.

Also, in the example of FIGS. 2 and 3, a single record is written to a single block, but records and blocks do not necessarily need to exist in a one-to-one relationship, and a plurality of records may also be written to a single block. For example, a handling consent record related to acquisition from the data-related party and a handling consent record related to disclosure of the acquired data (disclosure consent) may be written to a single block. Also, a plurality of categories of the same type may be described inside a single record. For example, a plurality of consents, such as consent to acquisition and consent to disclosure (disclosure consent), may be included in a single handling consent record. Alternatively, consent related to acquisition for each of a plurality of related parties may be included in a single handling consent record related to acquisition. Also, in the case where a plurality of data is provided at once on the basis of a plurality of consents, information indicated by a plurality of handling consent records related to data disclosure (disclosure consent) may be included in a handling execution record related to data disclosure (disclosure record).

A record may also be written to a block in any way, insofar as necessary information can be read from the block. For example, all or part of a record may also be included in a block as metadata.

By writing records to a blockchain in this way, traceability can be secured. Note that because the blocks in the blockchain are usable by the information processing apparatuses belonging to the blockchain system (P2P network), anonymity is a problem, but anonymity measures are also implemented in the blockchain of FIGS. 2 and 3. For example, in FIGS. 2 and 3, the BC user ID is indicated by the identifier (pseudonym) "hanako", but if the identifier is unrelated to the actual name of an individual, identifying the individual is difficult. By implementing a technique of pseudonymization in which a personal name is replaced by another character string, number, or the like on the basis of a predetermined rule, identifying individuals can be made more difficult.

Note that various information may be added to a record written to the blockchain. For example, details about the data to be acquired, provided, or the like may be added. In the case where the data management apparatus 101 provides a portion of data handed over from the related party apparatus 501 to the using party apparatus 701, information enabling the portion to be recognized, such as one or more category names or positions inside the data for example, may also be included in a record. Additionally, in the case where there is a single data management apparatus 101, the BC user ID of the data management apparatus 101 acting as the provider does not have to be included in a record.

If records are written to the blockchain in this way, a history of consent with respect to disclosure to third parties and the disclosure can be checked while also reducing the disadvantages that may occur in the event of a data leak, such as the further leaking of information that could be used to identify the data-related party through data collation.

For example, by using a BC user ID of an ordinary identifier as a search key to read out the handling consent records written to blocks on the blockchain, the data-related party can confirm whether or not the handling conforms to the content of the consent intended by the data-related party. In the example of FIGS. 2 and 3, the related party apparatus 501 can use "hanako" as a search key to detect the blocks 300 and 313. Accordingly, it is possible to confirm whether or not the consent to acquisition (which also encompasses consent to retention and usage) is valid.

Additionally, a using party A cannot recognize that the identifier "j1k2m3" for a using party B represents the same data-related party as the identifier "g7h8i9" for the using party A. Likewise, the using party B cannot recognize that the identifier "g7h8i9" for the using party A represents the same data-related party as the identifier "j1k2m3" for the using party B. For this reason, even if one of either the using party A or the using party B leaks data, the other party would be unable to identify the data as being data related to "hanako" through collation. Consequently, the disadvantages from a data leak can be reduced.

Note that if the data-related party knows the identifier for the data-using party, "g7h8i9" corresponding to "hanako" can be used as a search key to detect the blocks 303 and 317. Accordingly, it is possible to confirm whether or not the consent to disclosure with respect to the using party A referred to as "company1" is valid. Similarly, "j1k2m3" corresponding to "hanako" can be used as a search key to detect the blocks 304 and 318. Accordingly, it is possible to confirm whether or not the consent to disclosure with respect to the using party B referred to as "company2" is valid. The ordinary identifier of the data-related party giving consent to data disclosure, data acquisition, and the like or the identifier for the using party may also be confirmed by querying an information processing apparatus aware of the correspondence relationship between the ordinary identifier of the data-related party and the identifier that identifies the data-related party and is uniquely assigned to each using party.

Note that, as illustrated in FIG. 3 above, the related party apparatus 501 may also rescind consent to disclosure after having consented to data disclosure. For this reason, when providing data, the ability to confirm that consent to disclosure has not been rescinded is preferable. Namely, in the case where the related party apparatus 501 rescinds consent to the disclosure of data, a record of rescinding the consent to disclosure is written to the blockchain. When providing data, the data management apparatus 101 preferably searches the blockchain using the BC user ID of the related party apparatus 501 as a search key to determine whether the consent to disclosure has not been rescinded. Note that in the case where a validity period is indicated by a consent to disclosure, it is preferable to confirm that the validity period indicated by the consent to disclosure has not expired. In this way, when providing data, it is preferable to confirm the validity of the consent to disclosure.

Note that although only "dealer1" (second business operator) is described as a data-handling party in the above, a plurality of handling parties may also exist in some cases. In such cases, the BC user ID of the data-related party may be changed for each of the plurality of data-handling parties. Also, the BC user ID of the data-related party may be changed for each combination of a data-handling party (second business operator) and a data-using party (first business operator). For example, "g7h8i9" is used in a handling consent record for data disclosure from the data-handling party "dealer1" to the data-using party "company1". On the other hand, an identifier different from "g7h8i9" is used in a handling consent record for data disclosure from a different data-handling party referred to as "dealer1" to the data-using party "company1". With this arrangement, the disadvantages from a data leak can be reduced.

Note that the blockchain in FIGS. 2 and 3 is an example, and a variety of records may be written to the blockchain. For example, usage records, such as records of a data-using party executing data analysis, editing, erasure, and the like, may also be written as handling execution records. Additionally, a handling execution record related to receipt may also include information such as a category of the received data and the BC user ID of the data management apparatus 101 that provided the data (the BC user ID of the source that transmitted the data).

Figure 4:
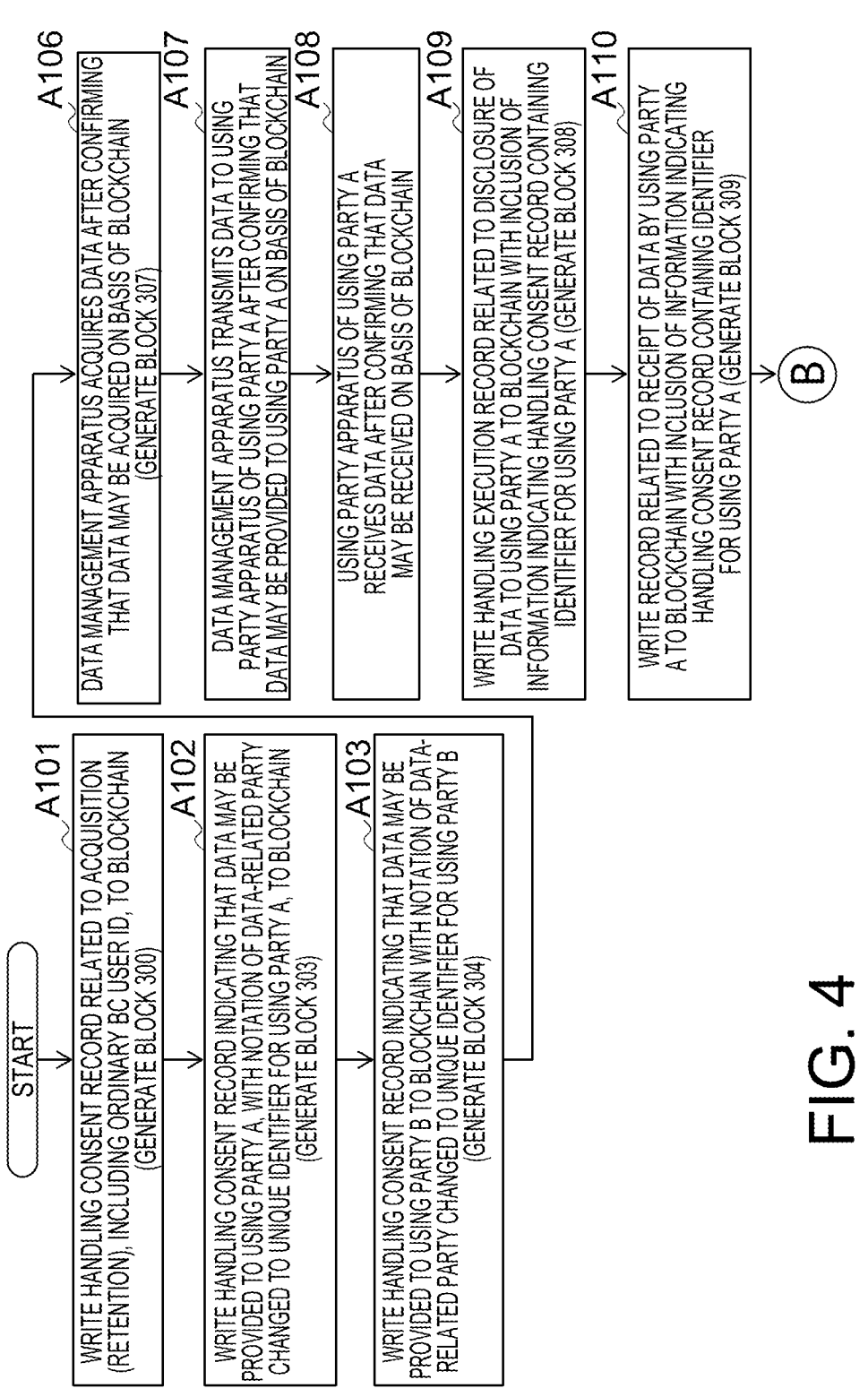
FIG. 4 is a schematic flowchart of an overall process according to the present embodiment.
Figure 5:
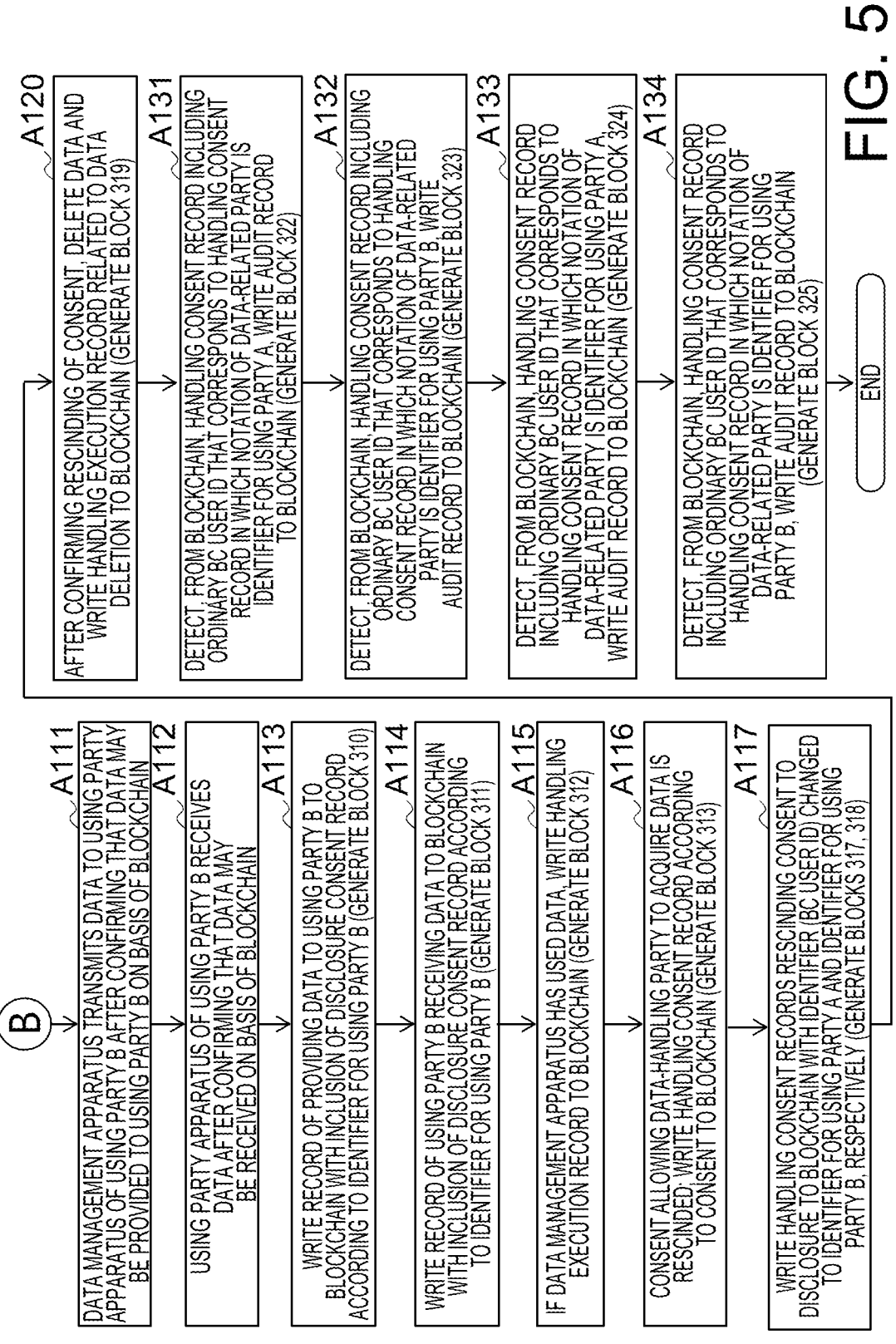
FIG. 5 is a continuation of the flowchart in FIG. 4.

Hereinafter, a process for generating the blockchain illustrated in FIGS. 2 and 3 will be described. FIG. 4 is a schematic flowchart of an overall process according to the present embodiment. FIG. 5 is a continuation of the flowchart in FIG. 4.

It is assumed that the acting party that writes to the blockchain may change. As an example, consent records are written by the data-related party, whereas handling execution records of acquisition, usage, or the like are written by the apparatus (handling party apparatus, using party apparatus) of the acting party that has executed acquisition, usage, or the like of data. However, it is also possible to request another apparatus to write a record, and the requested apparatus may write the record. In the following description, the record to be written may be described as the grammatical subject and the acting party that writes the record may be omitted in some cases, but as described above, records may be written by any apparatus.

Also, the flow of data to be handled may be performed prior to the writing of a record to the blockchain, but the flow of data and the writing to the blockchain may also be performed in reverse order or at the same time. For example, data may be received after a handling consent record related to acquisition is written, or a handling consent record for acquisition may be written after data is received together with the acquisition consent. Also, in the case of handling a plurality of data in parallel, the present flow is processed in multiple, parallel instances. Hereinafter, the flow will be described in detail.

The following presumes that when the using party "company1" starts a transaction with the handling party "dealer1", the using party apparatus of "company1" creates the block 320 after confirming the legitimacy of data acquisition by "dealer1" (consent to "dealer1" acquiring data from the data-related party). The following also assumes that when the using party "company2" starts a transaction with the handling party "dealer1", the using party apparatus of "company2" creates the block 321 after confirming the legitimacy of data acquisition by "dealer1" (consent to "dealer1" acquiring data from the data-related party). However, as described later, the blocks 320 and 321 are not limited to being created at the above timings.

A handling consent record is written to the blockchain on the basis of consent by the data-related party allowing the data-handling party (in the example of FIG. 2, "dealer1") to acquire data of the data-related party (A101). With this arrangement, the block 300 in FIG. 2 is generated. Note that the execution of the process in step A101 may be triggered when the data management apparatus 101 receives data of the data-related party, or the handling consent record only may be generated and written to the blockchain prior to the receipt of such data. Here, the latter case is assumed.

Furthermore, a handling consent record (first consent record) indicating that the data may be provided to the using party A (in the example of FIG. 2, "company1") is written to the blockchain on the basis of consent by the data-related party allowing the data-handling party to provide the data to the using party A (A102). In this record, the ordinary identifier (in the example of FIG. 2, the pseudonym "hanako") is changed in the data management apparatus 101 to an identifier (in the example of FIG. 2, "g7h8i9") unique to the using party A, and the changed identifier is used as the BC user ID of the data-related party. A handling consent record (first consent record) indicating that the data may be provided to the using party B (in the example of FIG. 2, "company2") is written to the blockchain on the basis of consent by the data-related party allowing the data-handling party to provide the data to the using party B (A103). In this record, the ordinary identifier ("hanako") is changed in the data management apparatus 101 to an identifier (in the example of FIG. 2, "j1k2m3") unique to the using party B, and the changed identifier is used as the BC user ID of the data-related party. Through the processes in steps A102 and A103, the blocks 303 and 304 in FIG. 2 are generated.

The disclosure of data enables receipt and use of the data by a data-using party. In the case of a handling consent record related to data handling such as data disclosure that, if executed, allows a using party to receive and use data, the identifier of the data-related party in the handling consent record is changed to an identifier uniquely corresponding to the using party and the changed handling consent record is written, as in the above steps S102 and S103.

Note that the identifier uniquely corresponding to the using party may be determined appropriately. An identifier uniquely corresponding to the using party may be acquired by converting all or part of the ordinary BC user ID according to a predetermined rule, or a unique identifier may be newly assigned to the using party. For example, the ordinary BC user ID may be converted on the basis of an individual key possessed by each third party (using party). Also, an identifier uniquely corresponding to the using party may be acquired by converting the ordinary BC user ID on the basis of a combination of an individual key possessed by each third party and an individual key possessed by the data-related party. The ordinary BC user ID may also be encrypted. The identifier (first business operator identifier) uniquely corresponding to the using party is held in the using party identifier correspondence table 91, in association with the ordinary identifier of the user (related party identifier).

When the data management apparatus 101 attempts to acquire data, the data management apparatus 101 first confirms that the data may be acquired on the basis of the blockchain (block 300), and then acquires the data (A106). The block 307 indicating the handling execution record related to data acquisition is generated with the inclusion of information (consent ID 00) indicating the handling consent record. The source of the data may be the related party apparatus 501 or another information processing apparatus.

Thereafter, suppose that the data management apparatus 101 attempts to provide data to the using party A. In this case, the data management apparatus 101 first confirms that the data may be provided to the using party A on the basis of the blockchain (block 303), and then transmits the data to the using party apparatus 701 of the using party A (A107). On the other hand, the using party apparatus 701 of the using party A that receives the provided data first confirms that the data is receivable on the basis of the blockchain (block 303 and block 320 (acquisition background record)) before receiving the data (A108).

More specifically, whether or not the data is providable and receivable is checked using the BC user ID corresponding to the recipient using party apparatus 701. In the example of FIG. 3, in the case of attempting to provide data about "hanako" to "company1", the BC user ID "g7h8i9" of "hanako" for "company1" is used as a search key to detect handling consent records. With this arrangement, the blocks 303 in which "g7h8i9" is written in the handling consent record are detected, and it is determined that consent related to disclosure has been established. Furthermore, the confirmation that the data may be provided to the using party A and the confirmation that the using party A may receive the data may also include a confirmation, based on the block 303 and the block 320 (acquisition background record) that the data-handling party may acquire the data from the data-related party. Here, the confirmation that data may be received is based on the block 303 and the block 320

(acquisition background record), but depending on the timing of auditing, if an audit record (see the block 322) already exists at the time (if an audit has already been performed), the confirmation may also be based on the block 303 and the audit record. That is, whether the confirmation is to be based on the block 303 and the block 320 (acquisition background record) or based on the block 303 and the audit record is optional, depending on the timing of auditing.

Note that the data management apparatus 101 and the using party apparatus 701 may reference the blockchain directly to check whether data is providable and receivable. Otherwise, the data management apparatus 101 and the using party apparatus 701 may also request another information processing apparatus belonging to the blockchain system 201 to determine whether data is providable and receivable. Note that causing a large number of information processing apparatuses belonging to the blockchain system 201 to determine whether data is providable and receivable has the merit of ensuring transparency in the determination.

Thereafter, a handling execution record related to the disclosure of data to the using party A by the data-handling party is written to the blockchain with the inclusion of information identifying the handling consent record that contains the identifier for the using party A (A109). With this arrangement, the block 308 in FIG. 2 is generated. Also, a handling execution record related to the receipt of data by the using party A is written to the blockchain with the inclusion of information identifying the handling consent record that contains the identifier for the using party A (disclosure consent ID 03) (A110). With this arrangement, the block 309 in FIG. 2 is generated.

In the above handling execution record of disclosure (block 308) and handling execution record of receipt (block 309), identifiers (such as ordinary identifiers) other than the identifier for the using party A are removed. This prevents a third party from collating data to thereby identify which related party the data belongs to. The block 308 includes the transaction ID 03 of the handling consent record related to disclosure containing the identifier "g7h8i9" for the using party A as the consent ID.

The block 309 includes the transaction ID 03 of the handling consent records related to disclosure and receipt containing the identifier "g7h8i9" for the using party A and the transaction ID 111 of the acquisition background records.

In the case where the data management apparatus 101 attempts to provide data to the using party B, a process similar to the case of attempting to provide data to the using party A is performed. More specifically, as illustrated in FIG. 5, the data management apparatus 101 first confirms that the data may be provided to the using party B on the basis of the blockchain (block 304), and then transmits the data to the using party apparatus 701 of the using party B (A111). On the other hand, the using party apparatus 701 of the using party B that receives the provided data first confirms that the data is receivable on the basis of the blockchain (block 304 and block 321 (acquisition background record)) before receiving the data (A112). Additionally, a handling execution record related to the disclosure of data to the using party B is written to the blockchain with the inclusion of information indicating the handling consent record that contains the identifier for the using party B (disclosure consent ID 04) (A113). With this arrangement, the block 310 is generated. Also, a handling execution record related to the receipt of data by the using party B is written to the blockchain with the inclusion of information indicating the handling consent record that contains the identifier for the using party B (disclosure consent ID 04) (A114). With this arrangement, the block 311 is generated. The transaction ID 04 of the handling consent record related to disclosure and receipt, which includes the identifier "j1k2m3" for the using party B, and the transaction ID 112 of the acquisition background record are included in the block 311.

Here, the confirmation that the using party apparatus 701 of the using party B may receive the data is based on the block 304 and the block 321 (acquisition background record), but depending on the timing of auditing, if an audit record (see the block 323) already exists at the time (if an audit has already been performed), the confirmation may also be based on the block 304 and the audit record. That is, whether the confirmation is to be based on the block 304 and the block 321 (acquisition background record) or based on the block 304 and the audit record is optional, depending on the timing of auditing.

The IDs indicating the handling consent records included in the blocks 310 and 311 (disclosure consent) all indicate the handling consent records related to the identifier "j1k2m3" for the using party B.

Accordingly, the blocks 308 and 310 are both handling execution records related to disclosure, but because the recipient using parties are different, the disclosure consent IDs included in each are different. Also, the blocks 309 and 311 are both handling execution records related to receipt, but because the receiving using parties are different, the disclosure consent IDs and the acquisition background IDs included in each are different.

The data management apparatus 101 uses (for example, analyzes) data. Note that usage is also an example of the handling of data. Thus, a handling execution record is generated by the data management apparatus 101 and written to the blockchain, for example. With this arrangement, the block 312 is generated (A115).

Thereafter, the consent allowing the data-handling party (in the example of FIG. 3, "dealer1") to acquire data is rescinded by the data-related party, and a handling consent record related to the consent is written to the blockchain by, for example, the related party apparatus 501 (A116). With this arrangement, the block 313 is generated.

When consent to acquisition is rescinded, if information about the rescinding of the corresponding consent to disclosure has not been written to the blockchain, a handling consent record rescinding the consent to disclosure is written to the blockchain by, for example, the related party apparatus 501 or the data management apparatus 101 (A117). With this arrangement, the block 317 containing the identifier for the using party A and the block 318 containing the identifier for the using party B are generated.

The data management apparatus 101, after confirming the rescinding of consent (consent to acquisition) by the data-related party on the basis of the block 313, deletes the stored data (A120). The data management apparatus 101 generates a handling execution record related to data deletion, and information (consent ID 13) indicating the handling consent record is included in the generated handling execution record (also A120). The generated handling execution record is written to the blockchain (also A120). With this arrangement, the block 319 is generated.

Next, a process is performed so that the records for the data-related party expressed by the identifier for each using party are also traceable from the identifier. For example, if a third party does not know (with only the information in the blocks 300, 303, and 304) that "g7h8i9" corresponds to "hanako", the third party cannot recognize whether the data-related party "hanako" corresponding to "g7h8i9" has given consent to the data-handling party regarding the acquisition of data. Consequently, an information processing apparatus aware of the correspondence relationship between the identifiers before and after the change, namely a searcher 112 (searching circuitry) (see FIG. 9) of the verification/audit apparatus 1 in the present embodiment, searches the blockchain and detects the handling consent record of acquisition in which the data-related party is expressed by a BC user ID of an ordinary identifier (in the example of FIG. 3, "hanako"). A processor 113 (processing circuitry) of the verification/audit apparatus 1 acquires the using party identifier correspondence table 91 from the data management apparatus 101, and stores the using party identifier correspondence table 91 in storage 116. The processor 113 of the verification/audit apparatus 1 specifies the handling consent record (first consent record) (block 303) related to a first handling (for example, disclosure) that includes the identifier for the using party A as the notation of the data-related party, generates an audit record indicating the existence of a handling consent record of acquisition (second consent record) (block 300) corresponding to the specified handling consent record (block 303), and records the audit record in the first storage system 201 (A131). With this arrangement, the block 322 indicating the existence of the handling consent record of the block 300 is generated. The handling consent record (first consent record) may be specified by acquiring the handling consent record from the apparatus that generated the block 303, or by searching the first storage system 201.

FIG. 6 is a diagram illustrating the retrieval of blocks 322 to 325 of audit records in FIGS. 2 and 3. The block 322 indicates the existence ("YES") of a handling consent record of acquisition (block 300) corresponding to the block 303 with the disclosure content ID 03. The type of record is "audit", and the BC user ID is "auditor1", which indicates an auditor or the verification/audit apparatus 1. Here, "auditor1" corresponding to an identifier of an auditor. With the block 322, even a using party that only knows the BC user ID "g7h8i9" can recognize that the data-related party corresponding to "g7h8i9" has consented to data acquisition by the data-handling party. Note that even in this case, the using party does not know that the ordinary identifier of the data-related party corresponding to "g7h8i9" is "hanako".

Similarly, the processor 113 of the verification/audit apparatus 1 specifies the handling consent record (first consent record) (block 304) related to a first handling (for example, disclosure) that includes the identifier for the using party B as the notation of the data-related party, generates an audit record indicating the existence of a handling consent record (second consent record) (block 300) corresponding to the specified handling consent record (first consent record), and records the audit record in the first storage system 201 (A132). With this arrangement, the block 323 indicating the existence of the handling consent record of the block 300 is generated. The block 323 has the same content as the block 322 except that the disclosure consent ID is different.

The processor 113 of the verification/audit apparatus 1, which is an information processing apparatus aware of the correspondence relationship between the identifiers before and after the change, records as an audit record a handling consent record of rescindment (non-consent) corresponding to the block 317 (A133). With this arrangement, the block 324 (audit record) in FIG. 3 or 6 indicating the existence of the handling consent record of the block 313 (the rescindment of consent to data acquisition) is generated. With the block 324, even a using party that only knows the BC user ID "g7h8i9" can recognize that the data-related party corresponding to "g7h8i9" has rescinded consent to data acquisition by the data-handling party. Note that in this case, the using party does not know that the data-related party corresponding to "g7h8i9" is "hanako".

Similarly, the processor 113 of the verification/audit apparatus 1 records as an audit record a handling consent record of rescindment (non-consent) corresponding to the block 318 (A134). With this arrangement, the block 325 (audit record) in FIG. 3 or 6 indicating the existence of the handling consent record of the block 313 (the rescindment of consent to data acquisition) is generated.

If records are written to the blockchain in this way, a history of consent with respect to disclosure to third parties and the disclosure can be checked while also reducing the disadvantages that may occur in the event of a data leak, such as the further leaking of information that could be used to identify the data-related party through data collation.

For example, by using a BC user ID of an ordinary identifier as a search key to read out the handling consent records written to blocks on the blockchain, the data-related party can confirm whether or not the handling conforms to the content of the consent intended by the data-related party. In the example of FIGS. 2 and 3, the related party apparatus 501 can use "hanako" as a search key to detect the blocks 300 and 313. Accordingly, it is possible to confirm whether the consent to acquisition (consent to retention) is valid.

Also, at the time of step A110, the using party apparatus 701 of the using party A can use the identifier "g7h8i9" for the using party A as a search key to detect the block 303. Accordingly, it is possible to confirm that consent to disclose the received data has been established. Whether the block 322 (audit record) can be detected depends on the timing of auditing. With the block 322 (audit record) or the block 320 (acquisition background record), it is possible to confirm that the background of acquisition are clear for the received data. Likewise, at the time of step A113, the using party apparatus 701 of the using party B can use the identifier "j1k2m3" for the using party B as a search key to detect the block 304, and make a similar confirmation.

In this way, by generating a blockchain according to the processes illustrated in FIGS. 4 and 5, traceability is secured.

Figure 7:
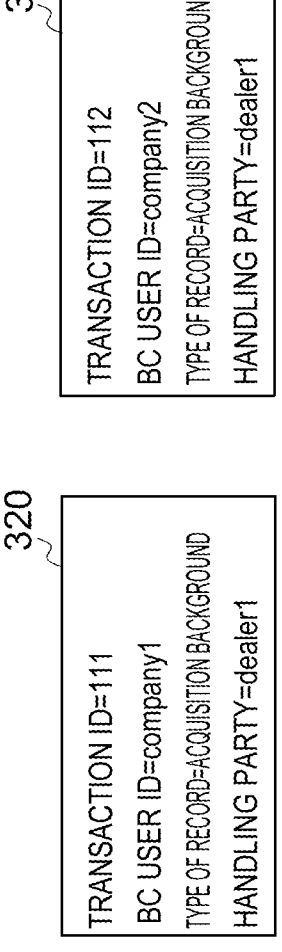
FIG. 7 is a diagram illustrating an excerpt from the blocks illustrated in FIG. 2 for explanatory purposes.

FIG. 7 is an illustration of an excerpt from the blocks 320 and 321 illustrated in FIG. 2 for explanatory purposes. The block 320 is an example in which a single record of the common acquisition background for all data-related parties is generated, and the data-related party acting as the provider is not indicated. In the example described above, the block 320 is created before "company1" receives data from "dealer1". Specifically, when "company1" starts a transaction with "dealer1", the using party apparatus of "company1" creates the block 320 after confirming the legitimacy of data acquisition or data receipt by "dealer1". As another example, the using party apparatus of "company1" may generate the record of acquisition background in the block 320 when the using party apparatus of "BC user ID=company1" has received data from "handling party=dealer1".

Similarly, the block 321 expresses a record of acquisition background related to data receipt by "BC user ID=company2" from "handling party=dealer1". Except for the different BC user ID, the block 321 is the same as the block 320. Thus, a detailed description of the block 321 is omitted.

Figure 8:
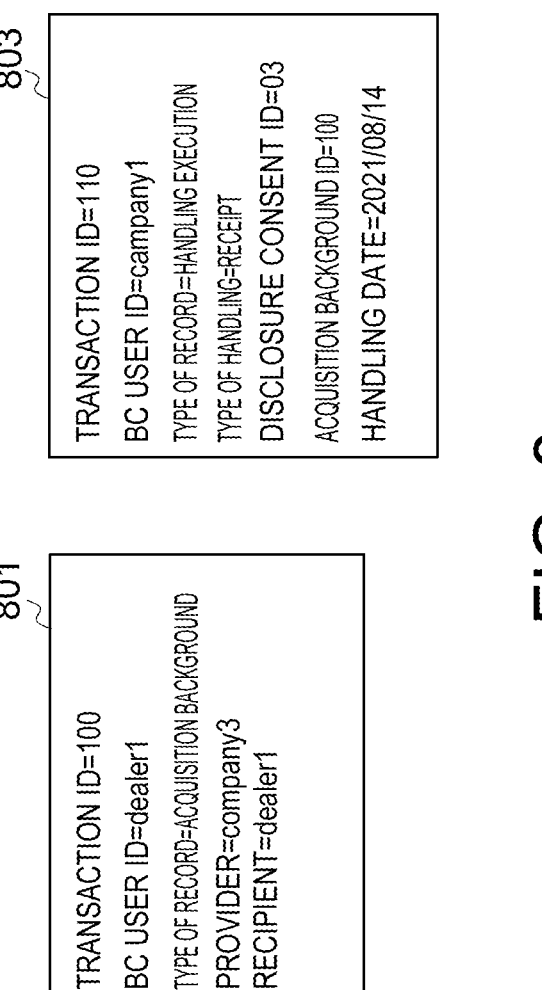
FIG. 8 is a diagram for explaining another example of records.

FIG. 8 is a diagram for explaining another example of records. FIG. 8 illustrates an example of blocks for two records, both of which have been extracted for description from records written to a blockchain.

A block 803 indicates a handling execution record indicating that the apparatus of "BC user ID=company1" has received data. The statement "disclosure consent ID=03" indicated in the block 803 indicates the handling consent record of the block 303. The statement "acquisition background ID=100" in the block 803 indicates the acquisition background record (block 801) serving as the basis of the data receipt. The acquisition background are the background of data acquisition by the provider of data. In the acquisition background record of ID 100, the background of acquisition by the provider "dealer1" are indicated.

More specifically, the block 801 contains a provider of data and a recipient of data (the acting party that has acquired the data) as the background of data acquisition. The statement "provider=company3" means that the party that actually transmitted the data to "dealer1" is "company3" rather than the data-related party "hanako". As described above, the data may also be acquired or received from a different information processing apparatus, such as the data management apparatus, rather than from the related party apparatus 501. In such cases, the data provider (in this example, "company3") may be included in the record and a record of the acquisition background may be generated, as in the block 801. Also, in the acquisition background records indicated in the blocks 320, 321 in FIG. 2, the BC user ID is "company1", "company1", but in the acquisition background record indicated in the block 801, the BC user ID is "dealer1".

A record of the acquisition background may be generated one at a time for each data-related party. In the case where the background of acquisition are the same for all data-related parties, a single record of the common acquisition background for all data-related parties may be generated. The block 801 is an example in which a single record of the common acquisition background for all data-related parties is generated. In the case of generating a record of the acquisition background for each data-related party, the BC user ID of the data-related party may be included in the record of the acquisition background.

The record of acquisition background in the block 801 may also be generated when the using party has received data. Alternatively, the using party may create the record of acquisition background before receiving data from the handling party. Specifically, when "company1" starts a transaction with "dealer1", the using party apparatus of "company1" may create the record of acquisition background after confirming the legitimacy of data acquisition or data receipt by "dealer1".

Hereinafter, the verification/audit apparatus 1 that verifies the consistency of records written to the blockchain will be described.

The verification of consistency is based on handling consent records, handling execution records, and handling execution by the handling party and the using party.

FIG. 9 is a block diagram of the verification/audit apparatus 1. The verification/audit apparatus 1 is provided with a receiver 111 (receiving circuitry), a searcher 112 (searching circuitry), a processor 113 (processing circuitry), a transmitter 115, and storage 116. The processor 113 includes a period calculator 114. Part or all of the receiving circuity, the searching circuitry and the processing circuity may be physically same circuit or separate circuits.

The receiver 111 receives, from a requester apparatus, a request to verify the consistency (consistency verification request) with respect to records (handling consent records or handling execution records) related to the handling of data. The requester apparatus may be any apparatus, such as the related party apparatus 501, a data management apparatus 101 that manages the data of related parties, an apparatus operated by an organization that audits handling parties, the using party apparatus 701, or an apparatus operated by an organization that audits using parties, but is not limited to a specific apparatus. The storage 116 stores identifier correspondence information, which is information including a correspondence between a BC user ID serving as an identifier for a using party and a BC user ID serving as an ordinary identifier (pseudonym or real name). In the case where the verification/audit apparatus 1 is an apparatus other than a data management apparatus 101 (for example, the using party apparatus 701), the identifier correspondence information does not have to be stored in the storage 116. Otherwise, in the case where the verification/audit apparatus 1 is the using party apparatus 701, the identifier correspondence information may include only a correspondence between an identifier for a using party and an ordinary identifier corresponding to the using party apparatus 701.

The searcher 112 searches the first storage system 201 (in this example, a blockchain). In one example, the searcher 112 searches the first storage system 201 (in this example, a blockchain) on the basis of a condition included in the verification request, and acquires handling consent records and handling execution records that are related to each other. In other words, the searcher 112 transmits a search request to the first storage system 201 and receives, as a response from the first storage system 201, the handling consent records and handling execution records that are related to each other and that satisfy the condition. At this time, if it is necessary to specify an ordinary identifier from an identifier for a using party, the searcher 112 uses the identifier correspondence information in the storage 116. The handling consent records or the handling execution records are retrieved on the basis of the condition designated by the verification request. As an example, the condition designates the value of a field included in the handling consent records or handling execution records.

The period calculator 114 calculates at least one of a consent period or a non-consent period of the related party that is related to the handling of data, on the basis of the acquired handling consent records.

The processor 113 verifies the consistency on the basis of at least one of the consent period or the non-consent period and the acquired handling execution records. The processor 113 also generates the audit records described above.

The transmitter 115 transmits information indicating a verification result regarding consistency to the requester apparatus of the verification.

The processor 113 specifies a handling consent record (for example, the block 303) related to a first handling (for example, disclosure) that includes the identifier for the using party (for example, "company1") as the notation of the data-related party. This handling consent record corresponds to a first consent record.

The identifier included in the handling consent record is converted into an ordinary identifier. On the basis of the converted, ordinary identifier, the processor 113 causes the searcher 112 to search for a handling consent record (second consent record) of a second handling (for example, acquisition) in which the data-handling party ("dealer1") is expressed by the BC user ID of the ordinary identifier. The execution of the second handling by the data-handling party (first business operator) enables the execution of the first handling by the data-using party (second business operator).

The searcher 112, following an instruction from the processor 113, searches the first storage system 201 to detect a handling consent record of the second handling (for example, acquisition) by the data-handling party ("dealer1") in which the data-related party is expressed by the BC user ID ("hanako"). This handling consent record corresponds to a second consent record.

The search instruction from the processor 113 may be issued periodically, or a notification indicating that a handling consent record including an identifier for the using party may be received from the apparatus that generated the handling consent record or the apparatus that wrote the handling consent record to the first storage system 201, and a search may be performed at the timing when the notification is received. The identifier for the using party to be processed may be included in the notification, specified sequentially from the correspondence table 91, or designated by the auditor.

The processor 113 generates, on the basis of a search result returned by the searcher 112, an audit record including a record identifier (transaction ID) identifying the handling consent record (first consent record) related to the first handling by the using party and an indication of the presence or absence of a handling consent record (second consent record) related to the second handling above by the data-handling party.

For example, if the search returns a hit (is successful), an audit record indicating the existence of the handling consent record (second consent record) is generated. The processor 113 transmits, via the transmitter 115, an instruction for writing the audit record to the first storage system 201 to the apparatus (for example, the data management apparatus 101) that writes to the first storage system 201. In this case, the audit record includes a record identifier (transaction ID) identifying the handling consent record (first consent record) related to the first handling by the using party and information indicating the existence of a handling consent record (second consent record) related to the second handling above by the data-handling party. If the verification/audit apparatus 1 is capable of writing to the first storage system 201, the processor 113 may also perform the process of writing the audit record to the first storage system 201.

If the search does not return a hit, an audit record indicating the non-existence of the handling consent record (second consent record) is generated. The processor 113 transmits, via the transmitter 115, an instruction for writing the audit record to the first storage system 201 to the apparatus (for example, the data management apparatus 101) that writes to the first storage system 201. In this case, the audit record includes a record identifier (transaction ID) identifying the handling consent record (first consent record) related to the first handling by the using party and information indicating the non-existence of a handling consent record (second consent record) related to the second handling above by the data-handling party. If the verification/audit apparatus 1 is capable of writing to the first storage system 201, the processor 113 may also perform the process of writing the audit record to the first storage system 201.

Hereinafter, a specific example will be used to describe verification operations by the verification/audit apparatus 1 in detail.

Verification Example 1: Verification by Ordinary (Real Name or Pseudonym) BC User ID, Starting from Handling Execution Record of Receipt This example assumes that the verification/audit apparatus 1 is the data management apparatus 101, but the verification/audit apparatus 1 may also be any of the related party apparatus, the data management apparatus (handling party apparatus), or the using party apparatus, or some other information processing apparatus.

FIG. 10 is a flowchart of one example of operations in Verification Example 1.

Figure 11:
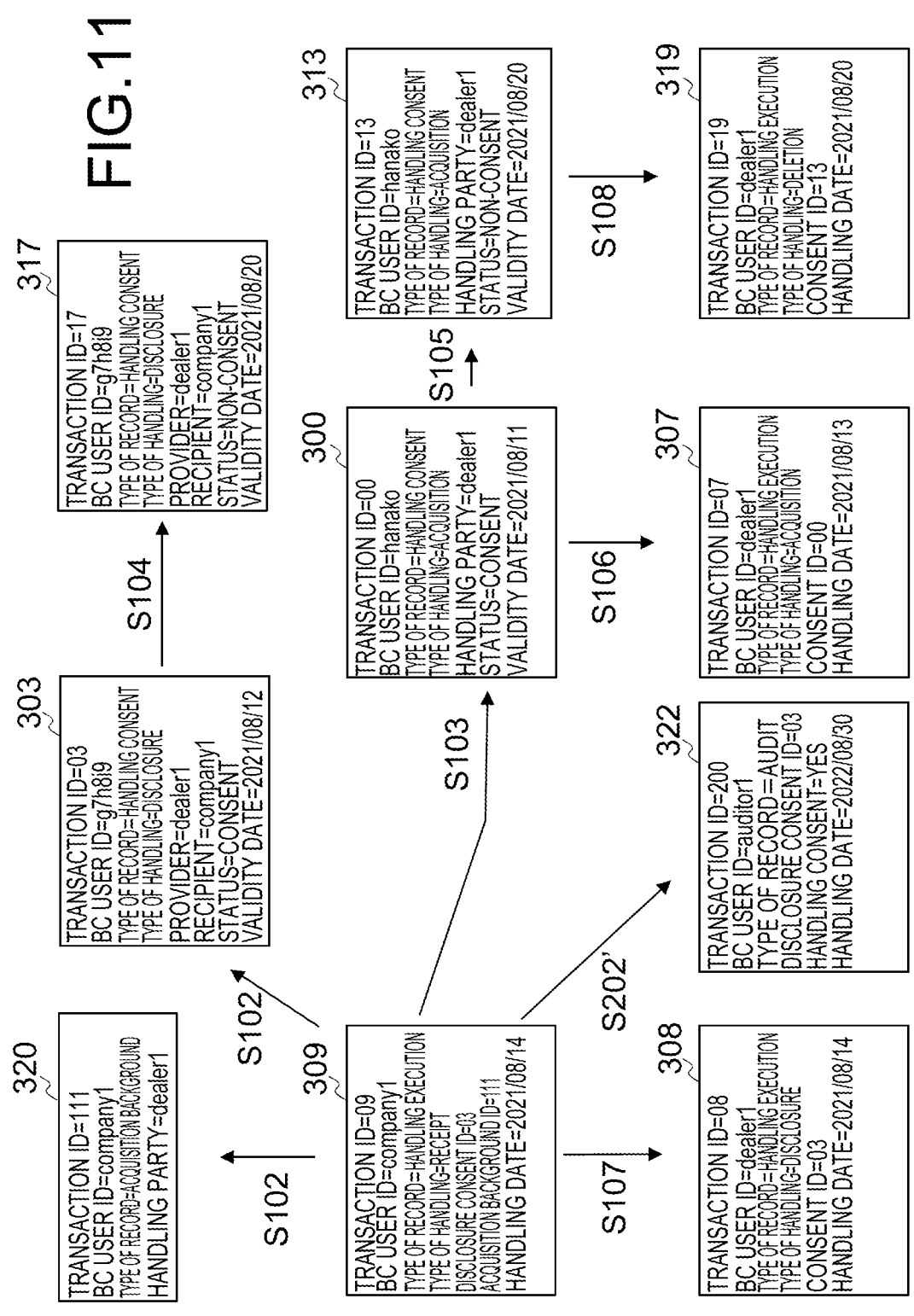
FIG. 11 is a diagram illustrating how blockchain records are traced in the operations of FIG. 10.

FIG. 11 is a diagram illustrating how blockchain records are traced in the operations of FIG. 10.

(Step S101)

The receiver 111 receives a consistency verification request regarding the handling execution record of receipt indicated in the block 309 of FIG. 2.

<Acquire Related Handling Consent Records and Handling Execution Records>

(Step S102)

The searcher 112 searches for handling consent records related to the handling execution record of the block 309 to be verified. The transaction IDs of the handling consent record and the acquisition background record referenced by the handling execution record of the block 309 are the ID 03 (block 303) and the ID 111 (block 320), and therefore the blocks 303 and 320 are acquired from the blockchain system. If either one of the handling consent record or the acquisition background record does not exist on the blockchain, the processor 113 detects an inconsistency (S114). Alternatively, it is also possible for the processor 113 to detect an inconsistency if neither the handling consent record nor the acquisition background record exists on the blockchain, and not detect an inconsistency if either one of the handling consent record or the acquisition background record exists.

In the handling execution record of the block 309, the type of handling is "receipt" and the BC user ID is "company1". For this reason, the processor 113 confirms that, in the handling consent record of the block 303, the type of handling is "disclosure" and the recipient is "company1". If at least one of the type of handling or the recipient does not exist or is different, the processor 113 detects an inconsistency. Since the provider is "dealer1" in the handling consent record of the block 303, the processor 113 confirms whether handling party is "dealer1" in the acquisition background record of the block 320. If the handling party does not exist or is different, the processor 113 concludes that a relevant handling consent record does not exist, and detects an inconsistency (S114).

(Step S103)

The searcher 112 searches for a handling consent record corresponding to the handling consent record acquired in step S102. Here, the verification/audit apparatus 1 has identifier correspondence information including a correspondence relationship between a BC user ID serving as an identifier for a using party and a BC user ID of an ordinary identifier (pseudonym or real name). From the BC user ID "g7h8i9" of the block 303, the searcher 112 uses the identifier correspondence information to acquire the corresponding BC user ID "hanako" of the ordinary identifier. The searcher 112 searches for a handling consent record in which the BC user ID is "hanako", the handling party matches that of the block 320, and the type of handling is acquisition, and acquires the block 300. The processor 113 detects an inconsistency if the handling consent record does not exist.

(Step S104)

The searcher 112 searches for a handling consent record in which the BC user ID, type of record, type of handling, and handling party match the handling consent record (block 303) and the status is non-consent, and acquires the block 317.

(Step S105)

The searcher 112 searches for a handling consent record in which the BC user ID, type of record, type of handling, and handling party match the handling consent record (block 300) and the status is non-consent, and acquires the block 313.

(Step S106)

The searcher 112 searches for a handling execution record of acquisition referencing the handling consent record of acquisition (block 300), and acquires the block 307.

(Step S107)

The searcher 112 searches for a handling execution record of disclosure in which the disclosure consent ID is the same ID 03 as the handling execution record of receipt (block 309), and acquires the block 308. If a handling execution record of disclosure does not exist, the processor 113 detects an inconsistency.

(Step S108)

The searcher 112 searches for a handling execution record of deletion referencing the handling consent record with the status of non-consent (block 313), and acquires the block 319.

<Acquire Consent Period and Non-Consent Period>

(Step S109)

The period calculator 114 calculates the consent period and the non-consent period on the basis of the handling consent records acquired in the steps so far. In this example, a plurality of handling consent records have been acquired, and therefore a period during which the respective periods of consent overlap is treated as the consent period. More specifically, the process is as follows.

The block 303 referenced by the block 309 is a handling consent record, the type of handling is "disclosure", the status is "consent", and the validity date is "Aug. 12, 2021". The handling consent record having the oldest validity date on or after the above validity date, and in which the type of handling is "disclosure" and the status is "non-consent", is the block 317. The validity date of the block 317 is "Aug. 20, 2021". Therefore, the consent period of "disclosure" is taken to be "Aug. 12-19, 2021".

The block 300 acquired in step S103 is a handling consent record, the type of handling is "acquisition", the status is "consent", and the validity date is "Aug. 11, 2021". The handling consent record having the oldest validity date on or after the above validity date, and in which the type of handling is "acquisition" and the status is "non-consent", is the block 313. The validity date of the block 313 is "Aug. 20, 2021". The consent period of "acquisition" is taken to be "Aug. 11-19, 2021".

The period during which the consent period of "acquisition" and the consent period of "disclosure" overlap is treated as the consent period and set to "Aug. 12-19, 2021".

<Determine Consistency on Basis of Records and Consent Period>

(Step S110)

The processor 113 determines whether the handling date of the handling execution record to be verified is included in the consent period. If the handling date is not included in the consent period, the processor 113 detects an inconsistency (S114). If the handling date is included in the consent period, the flow proceeds to the next step S111.

In this example, the handling date of the handling execution record to be verified is Aug. 14, 2021, from the block 309, and the consent period is "Aug. 12-19, 2021". Since the handling date is included in the consent period, the processor 113 does not detect an inconsistency. Consequently, the flow proceeds to the next step S111.

23

24

(Step S111)

The processor 113 determines whether the handling date of the handling execution record of the receipt of data is after the acquisition or receipt of the data by the providing party. If the handling date is before the acquisition or receipt, the processor 113 detects an inconsistency (S114). The processor 113 also determines whether the handling date of acquisition or receipt is included in the consent period, and if not included in the consent period, the processor 113 detects an inconsistency (S114). If the handling date is on or after the acquisition or receipt and the handling date of acquisition or receipt is included in the consent period, the flow proceeds to the next step S112.

In this example, the handling date of the handling execution record of receipt (block 309) to be verified is Aug. 14, 2021. The handling date of the handling execution record of acquisition (block 307) is Aug. 13, 2021. Accordingly, since receipt occurred after acquisition and the acquisition occurred within the consent period, the processor 113 does not detect an inconsistency. Consequently, the flow proceeds to the next step S112.

(Step S112)

The processor 113 determines whether a handling execution record of deletion exists between the handling execution record of acquisition and the handling execution record of receipt. If a handling execution record of deletion exists, the processor 113 detects an inconsistency (S114), and if not, the flow proceeds to step S113.

In this example, the handling date of the handling execution record of deletion (block 319) is Aug. 20, 2021. A handling execution record of deletion does not exist between the handling execution record of acquisition and the handling execution record of receipt, and therefore an inconsistency is not detected.

(Step S113)

The processor 113 determines whether the handling date of the handling execution record of receipt matches the handling date of the handling execution record of disclosure corresponding to the handling execution record of receipt. If the handling dates are not the same, the processor 113 detects an inconsistency (S114). If the handling dates are the same, the processor 113 determines that an inconsistency does not exist with respect to the handling execution record to be verified (S115).

In this example, the handling dates of the handling execution record of receipt (block 309) and the handling execution record of disclosure (block 308) corresponding to the handling execution record of receipt are both Aug. 14, 2021, and the handling dates match. Accordingly, it is determined that an inconsistency does not exist with respect to the handling execution record to be verified (block 309) (S115).

If an inconsistency is determined not to exist in step S115, the transmitter 115 transmits information indicating that an inconsistency was not detected to the requester apparatus as a verification result. If an inconsistency is detected in step S114, the transmitter 115 transmits information indicating that an inconsistency was detected to the requester apparatus as a verification result. At this time, the verification result may also include the reason why an inconsistency was detected.

Verification Example 2: Verification by BC User ID Serving as Identifier for using Party, Starting from Handling Execution Record of Receipt This example assumes that the verification/audit apparatus 1 is the using party apparatus 701, but the verification/ audit apparatus 1 may also be any of the related party apparatus, the data management apparatus (handling party apparatus), or the using party apparatus, or some other information processing apparatus.

Figure 12:
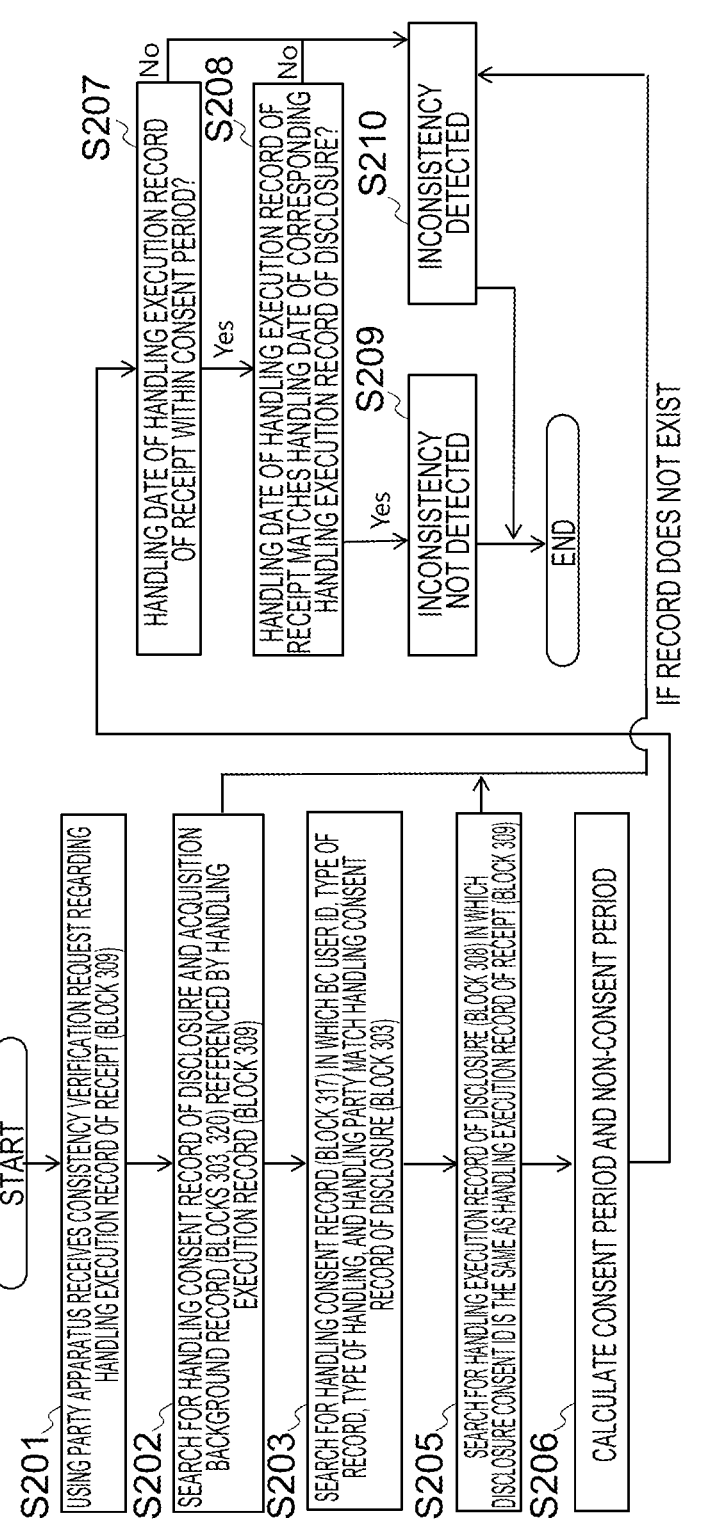
FIG. 12 is a flowchart of one example of operations in Verification Example 2.

FIG. 12 is a flowchart of one example of operations in Verification Example 2.

(Step S201)

The receiver 111 receives a consistency verification request regarding the handling execution record of receipt indicated in the block 309.

<Acquire Related Handling Consent Records and Handling Execution Records>

(Step S202)

The searcher 112 searches for a handling consent record of disclosure and an acquisition background record related to the handling execution record of receipt to be verified. With this step, the blocks 303 and 320 are acquired. If either one of the handling consent record or acquisition background record does not exist on the blockchain, the processor 113 detects an inconsistency (S210). Alternatively, it is also possible for the processor 113 to detect an inconsistency if neither the handling consent record nor acquisition background record exists on the blockchain, and not detect an inconsistency if either one of the handling consent record or acquisition background record exists. This step is the same as step S132 in FIG. 10.

(Step S203)

The searcher 112 searches for a handling consent record in which the BC user ID, type of record, type of handling, and handling party are the same as the handling consent record of disclosure (block 303), and acquires the block 317.

(Step S205)

The searcher 112 searches for a handling execution record of disclosure in which the disclosure consent ID is the same as the handling execution record of receipt (block 309), and acquires the block 308. If a handling execution record of disclosure does not exist, the processor 113 detects an inconsistency (S210).

<Acquire Consent Period and Non-Consent Period>

(Step S206)

The period calculator 114 acquires the consent period and the non-consent period on the basis of the handling consent re-records acquired in the steps so far.

The block 303 referenced by the block 309 is a handling consent record, the type of handling is "disclosure", the status is "consent", and the validity date is "Aug. 12, 2021". The handling consent record having the oldest validity date on or after the above validity date, and in which the type of handling is "disclosure" and the status is "non-consent", is the block 317. The validity date of the block 317 is "Aug. 20, 2021". Therefore, the consent period of "disclosure" is taken to be "Aug. 12-19, 2021".

<Determine Consistency on Basis of Records and Consent Period>

(Step S207)

The processor 113 determines whether or not the handling date of the handling execution record to be verified is included in the consent period. If the handling date is not included in the consent period, the processor 113 detects an inconsistency (S210). If the handling date is included in the consent period, the flow proceeds to the next step S208.

In this example, since the handling date of the handling execution record of receipt indicated by the block 309 to be verified is Aug. 14, 2021, and is included in the consent period "Aug. 12-19, 2021", an inconsistency is not detected. Therefore, the flow proceeds to step S208.

(Step S208)

The processor 113 determines whether the handling date of the handling execution record of receipt matches the handling date of the handling execution record of disclosure corresponding to the handling execution record of receipt. If the handling dates are not the same, the processor 113 detects an inconsistency. If the handling dates are the same, the processor 113 determines that an inconsistency does not exist (S115). In this example, it is determined that an inconsistency does not exist, similarly to step S113 in FIG. 9.

Verification Example 3: Verification based on Ordinary (Real Name or Pseudonym) BC User ID, Starting from Rescinding of Consent to Acquisition This example assumes that the verification/audit apparatus 1 is the data management apparatus 101, but like Verification Examples 1 and 2, the verification/audit apparatus 1 may also be another apparatus.

Figure 13:
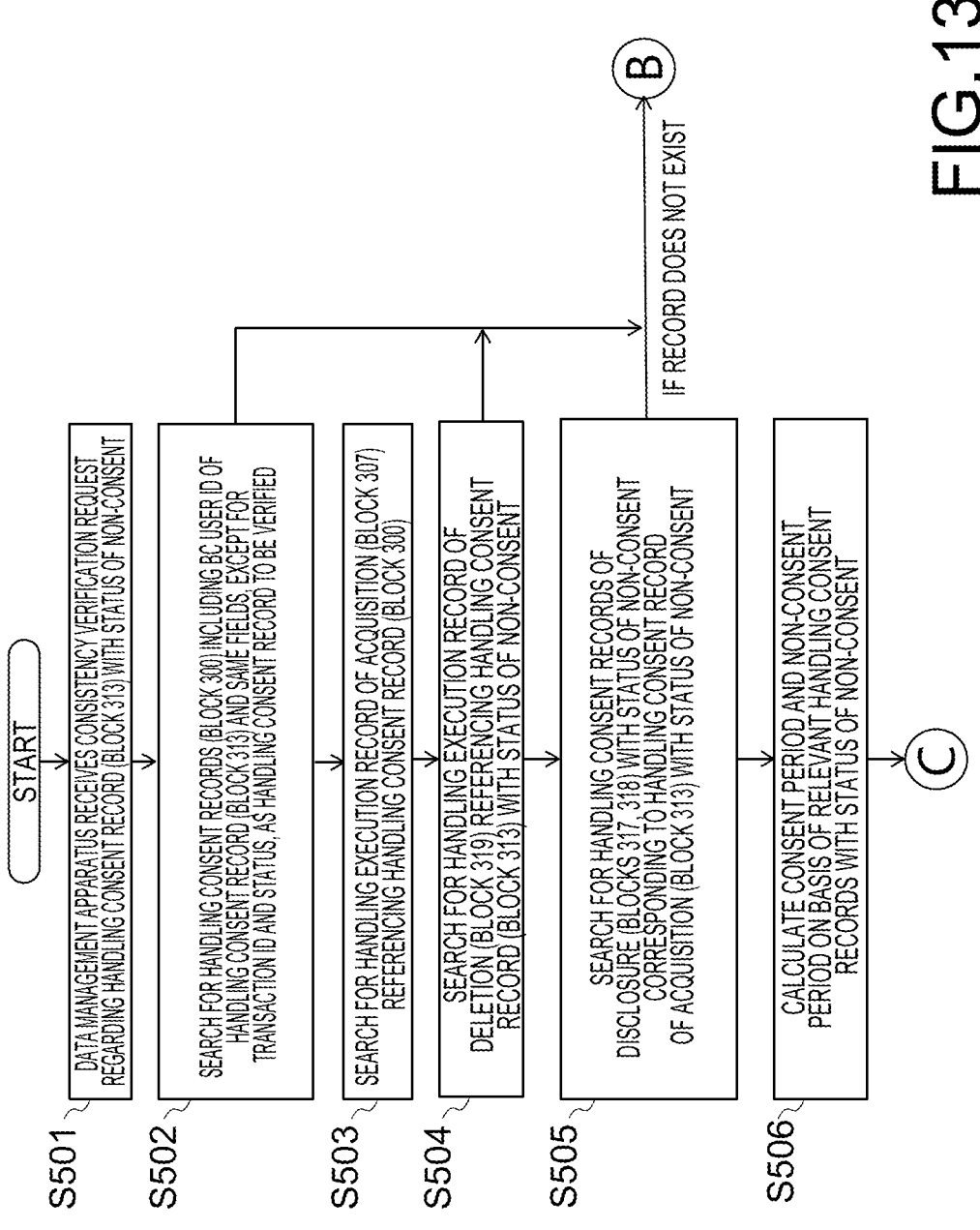
FIG. 13 is a flowchart illustrating one example of operations in Verification Example 3.
Figure 14:
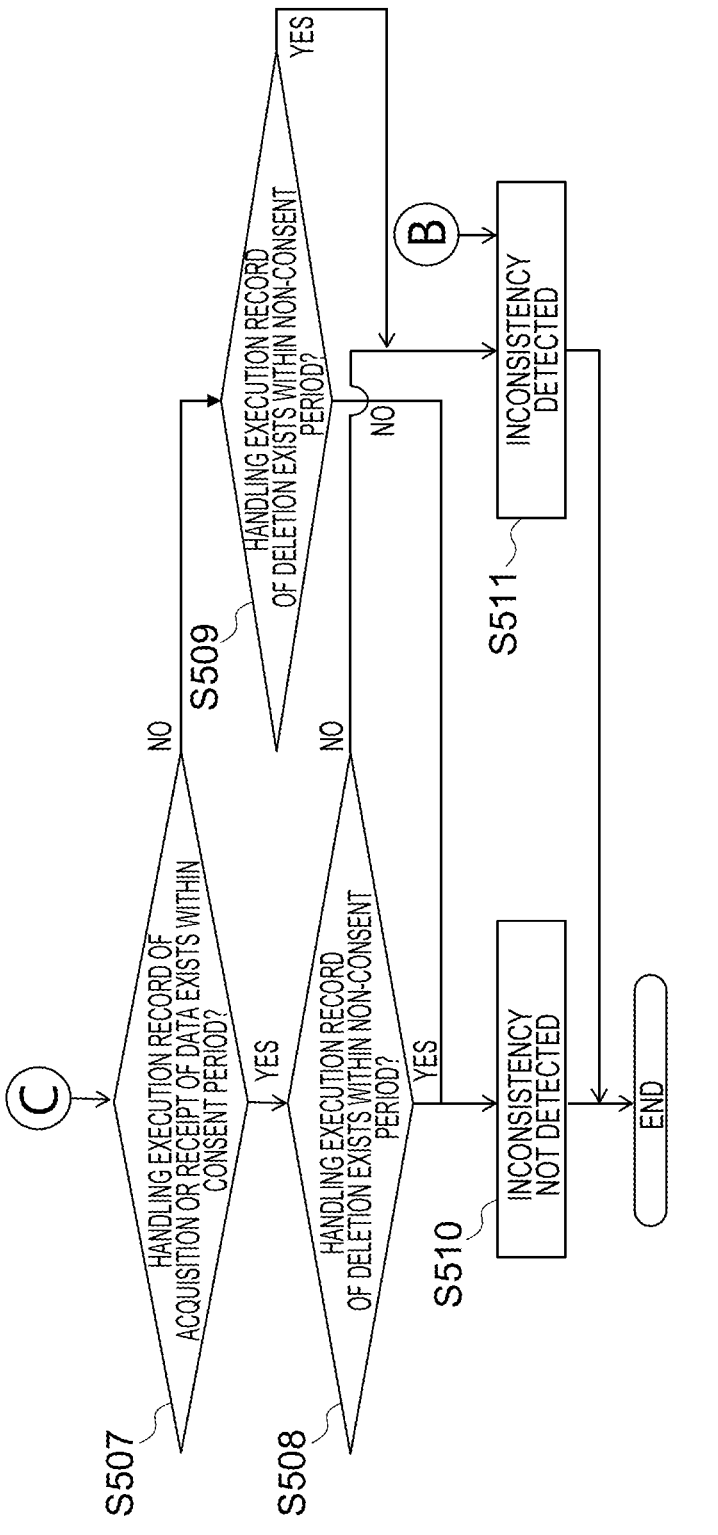
FIG. 14 is a continuation of the flowchart in FIG. 13.

FIG. 13 is a flowchart illustrating one example of operations in Verification Example 3. FIG. 14 is a continuation of the flowchart in FIG. 13.

The receiver 111 receives a consistency verification request regarding the handling consent record (block 313) with the status of non-consent (step S501).

<Acquire Related Handling Consent Records and Handling Execution Records>

(Step S502)

The searcher 112 searches for a handling consent record having the BC user ID of the handling consent record to be verified and in which the fields are the same as the handling consent record except for the transaction ID and the status.

In this example, the searcher 112 searches for a handling consent record having the BC user ID "hanako" of the handling consent record (block 313) and in which the fields are the same as the handling consent record (block 313) except for the transaction ID and the status. With this step, the block 300 is acquired.

(Step S503)

The searcher 112 searches for a handling execution record referencing the handling consent record (block 300), and acquires the block 307.

(Step S504)

The searcher 112 searches for a handling execution record of deletion referencing the handling consent record with the status of non-consent (block 313), and acquires the block 319. If a handling execution record does not exist on the blockchain, an inconsistency is detected.

(Step S505)

If consent to acquisition has been rescinded (block 313), consent to disclosure must be rescinded. The searcher 112 searches for a handling consent record of disclosure corresponding to the handling consent record (block 313). The searcher 112 uses the identifier correspondence information to acquire the BC user ID serving as the identifier of each corresponding using party from the BC user ID of the ordinary (real name or pseudonym) identifier. The searcher 112 uses the identifier correspondence information to acquire the corresponding BC user IDs "g7h8i9" and "j1k2m3" from the BC user ID "hanako" of the ordinary identifier. The searcher 112 searches for a handling consent record in which the BC user ID is "g7h8i9" or "j1k2m3", the type of record is "handling consent", the type of handling is "disclosure", the provider is the handling party "dealer1" in the block 313, and the validity date is on or before the validity date in the block 313. With this step, the block 317 and the block 318 are acquired.

If a handling consent record does not exist on the blockchain, the processor 113 detects an inconsistency (S511).

<Acquire Consent Period and Non-Consent Period>

(Step S506)

The period calculator 114 acquires the consent period and the non-consent period on the basis of the handling consent records acquired in the steps so far.

On the basis of the blocks 300 and 313, the consent period is taken to be Aug. 11-19, 2021. The non-consent period is taken to be "the period from Aug. 20, 2021, up to the time of verification".

<Detect Inconsistency from Records and Consent Period>

(Step S507)

If a handling execution record of the acquisition or receipt of data included in the consent period exists on the blockchain, the flow proceeds to step S508, whereas if not, the flow proceeds to step S509.

In this example, a corresponding handling execution record of the acquisition of data (block 307) exists, and therefore the flow proceeds to step S508.

(Step S508)

The processor 113 determines whether a handling execution record of deletion exists in the non-consent period. If such a record exists, an inconsistency is not detected (S510), whereas if such a record does not exist, the processor 113 detects an inconsistency (S511).

In this example, the handling execution record of deletion (block 319) containing the handling date "Aug. 20, 2021" within the non-consent period "from Aug. 20, 2021, up to the time of verification" exists, and therefore an inconsistency is not detected.

(Step S509)

The processor 113 determines whether a handling execution record of deletion exists in the non-consent period. If such a record exists, an inconsistency is detected (S511), whereas if such a record does not exist, an inconsistency is not detected (S510). In the example of the blockchain in FIGS. 2 and 3, an inconsistency is not detected.

Verification Example 4-1: Verification of Records Related to Processing and Data Access Log The verification/audit apparatus 1 accesses the correspondence table 91 and verifies the consistency of a records related to processing for each data-related party and a data access log.

Figure 15:
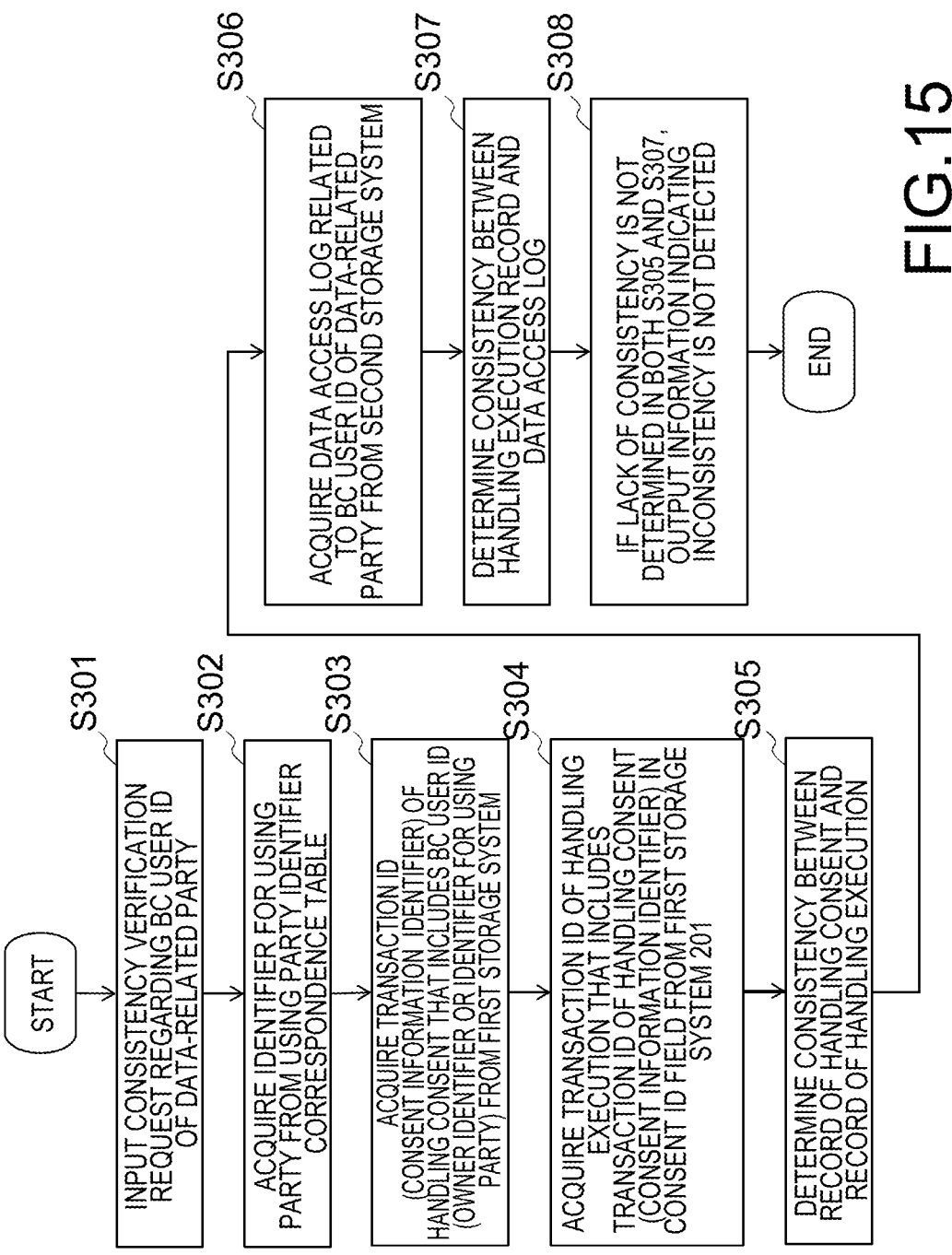
FIG. 15 is a flowchart of one example of operations by a verification/audit apparatus.
Figure 20:
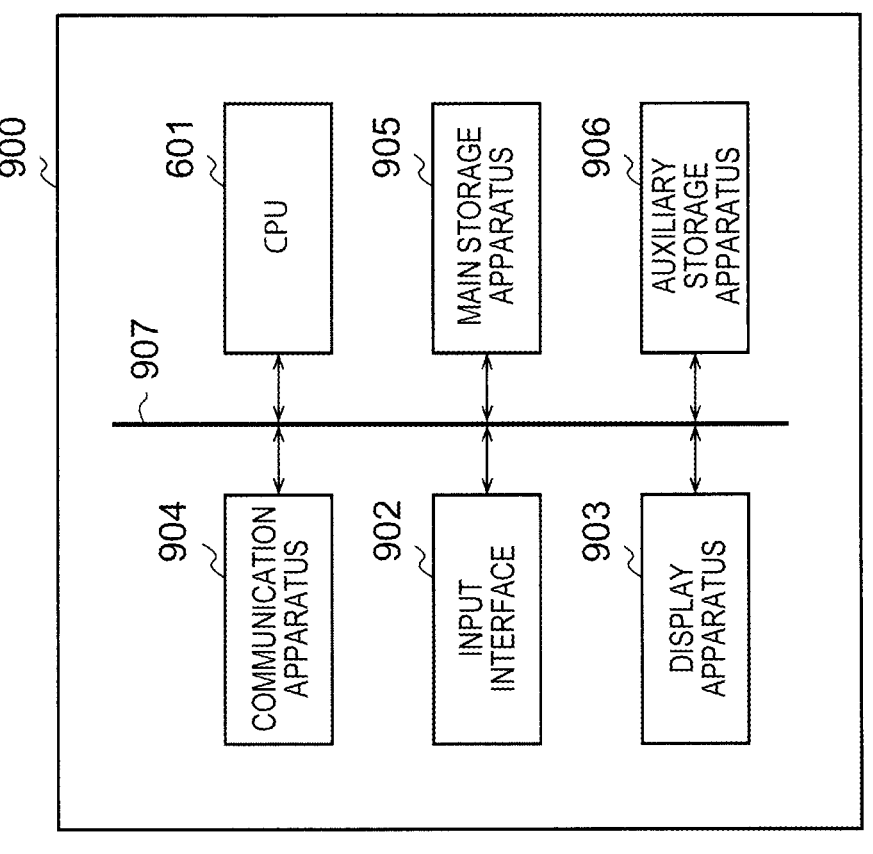
FIG. 20 is a diagram illustrating a hardware configuration of a verification/audit apparatus (information processing apparatus).

FIG. 15 is a flowchart of one example of operations by the verification/audit apparatus 1.

Step S301: The verification/audit apparatus 1 receives a consistency verification request regarding the BC user ID (for example, an owner identifier) of the data-related party.

Step S302: The verification/audit apparatus 1 acquires the BC user ID that is an identifier for the using party from the correspondence table 91, on the basis of the BC user ID (owner identifier) of the data-related party.

Step S303: The verification/audit apparatus 1 acquires, from the first storage system 201, the transaction IDs (consent information identifiers) of handling consent including the BC user ID (owner identifier or identifier for the using party).

Step S304: The verification/audit apparatus 1 acquires, from the first storage system 201, the transaction IDs of handling execution that include the transaction IDs (consent information identifiers) of handling consent in the consent ID field. If the BC user ID (identifier for using party) of the data-related party is included in a handling execution record (record related to processing), the verification/audit apparatus 1 may acquire, from the first storage system 201, the transaction IDs of handling execution that include the BC user ID (owner identifier or identifier for the using party) of the data-related party.

Step S305: The verification/audit apparatus 1 verifies the consistency of the handling consent (records related to consent) and the handling execution records (records related to processing). The method of verification is not limited to a particular method.

Step S306: The verification/audit apparatus 1 acquires, from the second storage system 601, a data access log (see FIG. 16 described later) related to the BC user ID of the data-related party (data owner or the like). In the data access log, the BC user ID for the business operator of record to be verified is used as the BC user ID of the data-related party (the BC user ID is different for each business operator of record, even for the same data-related party). The business operator of record is a business operator that writes, reads, or deletes data or the like, and may be any of the data-handling party, the data-using party, or some other business operator.

Step S307: The verification/audit apparatus 1 verifies the consistency of the handling execution records (records related to processing) that include the BC user ID of the business operator of record to be verified from among the handling execution records with the transaction IDs acquired in step S304, and the data access log. The verification/audit apparatus 1 detects an inconsistency if at least one of a record-based verification and a log-based verification lacks consistency. The method of verification is not limited to a particular method.

Step S308: If no inconsistency is detected in both steps S305 and S307, the verification/audit apparatus 1 determines that no inconsistency is detected overall. The verification/audit apparatus 1 may also output (by displaying on a screen, for example) information indicating that no inconsistency is detected overall. If a lack of consistency is determined in at least one of steps S305 and S307, the verification/audit apparatus 1 determines that an inconsistency is detected overall. The verification/audit apparatus 1 may also output information indicating that an inconsistency is detected overall. In this case, the verification/audit apparatus 1 may additionally display on the screen information identifying the step (S305 or S307) in which the inconsistency is detected.

The following specifically illustrates an example of the operations in each step.

Step S301: The verification/audit apparatus 1 receives a consistency verification request regarding a BC user ID (hanako).

Step S302: The verification/audit apparatus 1 acquires, from the correspondence table 91, the BC user ID (g7h8i9) that is an identifier for the using party A and the BC user ID (j1k2m3) that is an identifier for the using party B corresponding to the BC user ID (hanako).

Step S303: The verification/audit apparatus 1 acquires, from the first storage system 201, the transaction IDs 00, 03, 04, 13, 17, 18 of handling consent including the BC user IDs (hanako, g7h8i9, j1k2m3).

Step S304: The verification/audit apparatus 1 acquires, from the first storage system 201, the transaction IDs 07, 08, 09, 10, 11, 12, 19 of handling execution including the transaction IDs 00, 03, 04, 13, 17, 18 of handling consent as the consent ID.

Step S305: The verification/audit apparatus 1 verifies the consistency of the handling consent (records related to consent) and the handling execution records (records related to processing). The verification/audit apparatus 1 determines that an inconsistency is not detected.

Step S306: The verification/audit apparatus 1 acquires, from the second storage system 601 (see FIG. 1), a data access log related to the BC user ID (hanako).

FIG. 16 is a diagram illustrating an example of a data access log 4-1. The logs on the first to fifth rows are acquired from the data access log in FIG. 16. The BC user ID of the business operator of record to be verified is assumed to be "dealer1". On the basis of "dealer1", the transaction IDs 07, 08, 10, 12, 19 of handling execution are acquired.

Step S307: The verification/audit apparatus 1 verifies the consistency of the relevant records of handling execution and the data access log. In the record-based verification, the verification/audit apparatus 1 determines that the log on the first row of the data access log corresponds to the acquisition record with the transaction ID 07, the log on the second row of the data access log corresponds to the disclosure record with the transaction ID 08, the log on the third row of the data access log corresponds to the disclosure record with the transaction ID 10, the log on the fourth row of the data access log corresponds to the usage record with the transaction ID 12, and the log on the fifth row of the data access log corresponds to the deletion record with the transaction ID 18. No inconsistency is detected in the record-based verification.

In the log-based verification, the verification/audit apparatus 1 determines that the acquisition record with the transaction ID 07 corresponds to the first row of the data access log and the deletion record with the transaction ID 18 corresponds to the fifth row of the data access log. No inconsistency is detected in the log-based verification. Note that the verification/audit apparatus 1 may also determine that no inconsistency is detected after having determined that the transaction IDs 08, 10, 12 correspond to the second to fourth rows of the data access log, respectively.

Therefore, the verification/audit apparatus 1 determines that no inconsistency is detected between the handling execution records (records related to processing) and the data access log.

Step S308: Since no inconsistency is detected in both steps S305 and S307, the verification/audit apparatus 1 determines that no inconsistency is detected overall.

Verification Example 4-2: Verification of Records Related to Processing and Communication Log The verification/audit apparatus 1 accesses the correspondence table 91 and verifies the consistency of handling execution records (records related to processing) for each data-related party and a communication log. Regarding the operations by the verification/audit apparatus in Verification Example 4-2, steps S301 to S305 and S308 in Verification Example 4-1 are also applied in a similar way to Verification Example 4-2. The operations corresponding to steps S306 and S307 are different from Verification Example 4-1.

Step S306: The verification/audit apparatus 1 acquires, from the second storage system 601, a communication log related to the BC user ID of the data-related party.

Step S307: The verification/audit apparatus 1 verifies the consistency of the handling execution records (records related to processing) that include the BC user ID of the business operator of record to be verified from among the handling execution records indicated by the transaction IDs acquired in step S304, and the communication log. An inconsistency is detected (a lack of consistency is determined) if at least one of a record-based verification and a log-based verification is determined to lack consistency.

The following specifically illustrates an example of the operations in each step.

Steps S301 to S305: These steps are similar to Verification Example 4-1 and therefore omitted here.

Step S306: The verification/audit apparatus 1 acquires, from the second storage system 601, the communication log related to the BC user IDs (hanako, g7h8i9, j1k2m3).

FIG. 17 is a diagram illustrating an example of a communication log 4-2. The verification/audit apparatus 1 is assumed to acquire only a communication log of personal data transmission and reception from the second storage system 601, and acquires the fourth to sixth rows of the communication log in FIG. 17. The BC user ID of the business operator of record to be verified is assumed to be "dealer1". On the basis of "dealer1", the transaction IDs 07, 08, 10, 12, 19 of handling execution are acquired.

Step S307: The verification/audit apparatus 1 verifies the consistency of the relevant records of handling execution and the communication log. In the record-based verification, the fourth row of the communication log corresponds to the transaction ID 07 (acquisition record), the fifth row of the communication log corresponds to the transaction ID 08 (disclosure record), and the sixth row of the communication log corresponds to the transaction ID 10 (disclosure record). No inconsistency is detected in the record-based verification.

In the log-based verification, the transaction ID 08 (disclosure record) corresponds to the fifth row of the communication log and the transaction ID 10 (disclosure record) corresponds to the sixth row of the communication log. No inconsistency is detected in the log-based verification. Note that in this example, the transaction ID 07 (acquisition record) exists in correspondence with the fourth row of the communication log, but in some cases, the transaction ID 07 (acquisition record) may not exist in correspondence with the fourth row of the communication log. As an example, in the receipt or acquisition of personal data, after personal data is received via a communication network, the presence or absence of acquisition consent is checked, and if there is no record related to consent or if the status of consent is non-consent, an operation of not writing personal data is allowed. For this reason, the lack of an acquisition record corresponding to data reception is not necessarily an inconsistency. Thus, in the log-based verification, it is not strictly necessary to confirm whether the transaction ID 07 (acquisition record) exists in correspondence with the fourth row of the communication log. In this example of operations, such a confirmation is not performed.

Therefore, the verification/audit apparatus 1 determines that no inconsistency is detected between the handling execution records (records related to processing) and the communication log.

Step S308: This step is similar to Verification Example 4-2 and therefore omitted here.

Verification Example 4-3: Verification of Records Related to Consent and Communication Log The verification/audit apparatus 1 accesses the correspondence table 91 and verifies the consistency of records related to consent for each data-related party and a communication log. Regarding the operations by the verification/audit apparatus in Verification Example 4-3, steps S301 to S305 and S308 in Verification Example 4-1 are also applied in a similar way to Verification Example 4-3. The operations corresponding to steps S306 and S307 are different from Verification Example 4-1.

Step S306: The verification/audit apparatus 1 acquires, from the second storage system 601, a communication log related to the BC user ID of the data-related party. In the log of the reception of consent by the data-related party, a BC user ID for the processing business operator to be verified is used.

Step S307: The verification/audit apparatus 1 verifies the consistency of the handling consent (records related to consent) that include the BC user ID of the processing business operator to be verified from among the handling consent records indicated by the transaction IDs acquired in step S304, and the communication log. An inconsistency (lack of consistency) is detected if at least one of a record-based verification and a log-based verification lacks consistency.

The following specifically illustrates an example of the operations in each step. The following assumes that the apparatus (related party apparatus) of the data-related party accesses the first storage system 201 not directly but via the processing business operator to be verified (for example, the data management apparatus 101 of the data-handling business operator). Consequently, the apparatus (for example, the data management apparatus 101) of the processing business operator holds a communication log corresponding to records related to consent, and the receiving party that receives the consent of the owner is the apparatus (for example, the data management apparatus 101) of the handling business operator.

Steps S301 to S305: These steps are similar to Verification Example 4-1 and therefore omitted here.

Step S306: The verification/audit apparatus 1 acquires, from the second storage system 601, a communication log related to the BC user ID (hanako). The verification/audit apparatus 1 is assumed to acquire only a communication log of the reception of consent by the data-related party, and acquires the first to third and seventh rows of the communication log in FIG. 17. The BC user ID of the processing business operator to be verified is assumed to be "dealer1". On the basis of "dealer1", the transaction IDs 00, 03, 04, 13, 17, and 18 of handling consent are acquired.

Step S307: The verification/audit apparatus 1 verifies the consistency of the relevant records of handling consent (consent information) and the communication log. In the record-based verification, the verification/audit apparatus 1 determines that the first row of the communication log corresponds to the acquisition consent with the transaction ID 00, the second row of the communication log corresponds to the disclosure consent with the transaction ID 03, the third row of the communication log corresponds to the disclosure consent with the transaction ID 04, and the seventh row of the communication log corresponds to the rescindment of acquisition consent with the transaction ID 13. The rescindments of disclosure consent with the transaction ID 17 and the transaction ID 18 are generated as an internal process based on the rescindment of acquisition consent with the transaction ID 13, and therefore do not have corresponding entries in the communication log. No inconsistency is detected in the record-based verification.

In the log-based verification, the acquisition consent with the transaction ID 00 corresponds to the first row of the communication log, the disclosure consent with the transaction ID 03 corresponds to the second row of the communication log, the disclosure consent with the transaction ID 04 corresponds to the third row of the communication log, and the rescindment of acquisition consent with the transaction ID 13 corresponds to the seventh row of the communication log. No inconsistency is detected in the log-based verification.

Therefore, the verification/audit apparatus 1 determines that no inconsistency is detected between the records related to consent and the communication log.

Step S308: This step is similar to Verification Example 4-1 and therefore omitted here.

Verification Example 4-4: Verification of Records Related to Consent and Authentication Log The verification/audit apparatus 1 verifies the consistency of records related to consent (consent information) for each data-related party (for example, the owner) and an authentication log. The following presumes that an authentication log corresponding to records related to consent is held by the processing business operator that authenticates the data-related party, or that the verification/audit apparatus 1 can access the authentication log.

When the data-related party gives consent to processing to the data management apparatus 101 and the data management apparatus 101 registers consent information (a record related to consent) on the basis of consent by the owner, the data management apparatus 101 authenticates the data owner. The method of authentication may be any method, such as electronic certificate authentication, one-time password authentication, or multi-factor authentication. The data-related party uses the related party apparatus 501 to access the data management apparatus 101 and input information necessary for giving consent (such as an owner identifier and information specifying details regarding the consent, for example) and information necessary for authentication. The data management apparatus 101 authenticates the data-related party on the basis of the inputted information, and determines to register consent information based on the consent given if the authentication is successful, or rejects the registration of consent information if the authentication is unsuccessful. The result (success or failure) of the authentication process is provided to and saved in the second storage system 601 as an authentication log.

In Verification Example 4-4, the verification/audit apparatus 1 accesses the correspondence table 91 and verifies the consistency of records related to consent for each data-related party and the authentication log. Regarding the operations by the verification/audit apparatus in Verification Example 4-4, steps S301 to S305 and S308 in Verification Example 4-1 are also applied in a similar way to Verification Example 4-4. The operations corresponding to steps S306 and S307 are different from Verification Example 4-1.

Step S306: The verification/audit apparatus 1 acquires, from the second storage system 601, an authentication log related to the BC user ID of the data-related party. In the authentication log for the data-related party, a BC user ID for the processing business operator to be verified is used as the BC user ID of the data-related party. The processing business operator is the business operator that performs processing for the data-related party (for example, the business operator that writes information to, or reads information from, the first storage system for the data-related party). The data-related party performs authentication related to the legitimacy of the data-related party (specially, authentication performed between the related party apparatus 501 and the data management apparatus 101) to request processing by the processing business operator, and the result of the authentication is stored as an authentication log.

Step S307: The verification/audit apparatus 1 verifies the consistency of the handling consent (records related to consent) that include the BC user ID of the processing business operator to be verified from among the handling consent records indicated by the transaction IDs acquired in step S304, and the authentication log.

The following specifically illustrates an example of the operations in each step. The following assumes that the apparatus (related party apparatus) of the data-related party accesses the first storage system 201 not directly but via the apparatus (for example, the data management apparatus 101) of the processing business operator to be verified. Consequently, an authentication log corresponding to the handling consent (records related to consent) is held by the apparatus (for example, the data management apparatus 101) of the processing business operator.

Steps S301 to S305: These steps are similar to Verification Example 4-1 and therefore omitted here.

Step S306: The verification/audit apparatus 1 acquires, from the second storage system 601, an authentication log related to the BC user ID (hanako).

FIG. 18 is a diagram illustrating an example of an authentication log 4-4. The verification/audit apparatus 1 is assumed to acquire only an authentication log for the data-related party, and in this example, acquires the first to fourth rows of the authentication log in FIG. 18. The content item of the authentication log includes authentication success or authentication failure. The date and time item is the date and time when authentication was executed, and may be more fine-grained than the date and time in the records related to processing. The related party item is the identifier of the party to be authenticated.

The BC user ID of the processing business operator to be verified is assumed to be "dealer1". On the basis of "dealer1", the transaction IDs 00, 03, 04, 13, 17, and 18 of handling consent are acquired.

Step S307: The verification/audit apparatus 1 verifies the consistency of the relevant records of handling consent (consent information) and the authentication log. In the record-based verification, the verification/audit apparatus 1 determines that the first row of the authentication log corresponds to the acquisition consent with the transaction ID 00, the second row of the authentication log corresponds to the disclosure consent with the transaction ID 03, the third row of the authentication log corresponds to the disclosure consent with the transaction ID 04, and the fourth row of the authentication log corresponds to the rescindment of acquisition consent with the transaction ID 13. The rescindments of disclosure consent with the transaction ID 17 and the transaction ID 18 are generated as an internal process based on the rescindment of acquisition consent with the transaction ID 13, and therefore do not have corresponding entries in the authentication log. No inconsistency is detected in the record-based verification.

Therefore, the verification/audit apparatus 1 determines that no inconsistency is detected between the handling consent (records related to consent) and the authentication log.

Step S308: This step is similar to Verification Example 4-1 and therefore omitted here.

According to the present embodiment above, by using an audit record or an acquisition background record, various records can be saved to the first storage system while preventing the leaking of the relationship between a related party such as an individual and a third party (using party, first business operator), that is, the relationship indicated by the identifier correspondence table. Moreover, by not keeping receipt consent and disclosure consent redundantly, the impact on the capacity of the first storage system can be reduced. Furthermore, the acquisition background record can be used to verify that the using party has the legitimate consent of the related party with regard to the handling of data.

Second Embodiment: using Audit Record for Consistency Verification

In the first embodiment, the acquisition background record is used for consistency verification (for example, see step S103 in FIG. 10). As described above, the acquisition background record can be created after each using party confirms the legitimacy of receiving data from the data-handling party when initiating a transaction with the data-handling party. In this case, each acquisition background record is considered to exist already when the handling consent records of disclosure with each using party designated as the recipient are created. On the other hand, an audit record is created by an auditor or an apparatus of an auditor after a handling consent record of disclosure is created. Consequently, depending on the timing of auditing, a situation could occur in which there is a handling consent record of disclosure exists but not an audit record.

Accordingly, the process of generating a blockchain in the first embodiment includes the following steps in which the using party uses an audit record or an acquisition background record. In the present embodiment, the apparatus of the auditor doubles as the verification/audit apparatus 1. However, the apparatus of the auditor may also be a separate apparatus from the verification/audit apparatus 1. In the following description, the process related to the generation of an audit record partially overlaps with the description in the first embodiment.

The using party apparatus 701 of the using party A that receives the data disclosure first confirms that the data is receivable on the basis of the blockchain (for example, blocks 303 and 320) before receiving the data (A108 in FIG. 4).

The using party apparatus 701 of the using party B that receives the data disclosure first confirms that the data is receivable on the basis of the blockchain (for example, blocks 304 and 321) before receiving the data (A112).

More specifically, at the time of step A110, the using party apparatus 701 of the using party A can use the identifier "g7h8i9" for the using party A as a search key to detect the block 303, and further detect the block 320 of the acquisition background. Accordingly, it is possible to confirm that consent to disclose the received data has been established and that the background of acquisition are clear for the received data. Likewise, at the time of step A113, the using party apparatus 701 of the using party B can use the identifier "j1k2m3" for the using party B as a search key to detect the block 304, further detect the block 321 of the acquisition background, and thereby make a similar confirmation.

At this point, if the data-related party is not described as the provider in the acquisition background record to prevent the leaking of the correspondence relationship between the identifiers representing the data-related party, confirmation of the acquisition background record alone does not constitute confirmation of the individual handling consent records of acquisition in relation to the data-related party. Accordingly, the process of generating the blockchain includes the following steps by the auditor or the apparatus (verification/audit apparatus 1) of the auditor.

The verification/audit apparatus 1 records a handling consent record corresponding to the block 303 as an audit record (A131 in FIG. 5). With this arrangement, the block 322 indicating the existence of the handling consent record of the block 300 is generated. With the block 322, even a using party that only knows the BC user ID "g7h8i9" can recognize that the data-related party "hanako" corresponding to "g7h8i9" has consented to data acquisition by the data-handling party. Similarly, the verification/audit apparatus 1 records a handling consent record corresponding to the block 304 as an audit record (A132 in FIG. 5). With this arrangement, the block 323 indicating the existence of the handling consent record of the block 300 is generated. Depending on the timing of auditing, the above steps for generating these audit records may occur at times other than in steps A131, A132 of FIG. 5. For example, each of the audit records may also be generated at any time after steps A102, A103 of FIG. 4 (for example, between steps A102 and A106, between steps A103 and A106). If the blocks of the audit records generated at times other than steps A131, A132 are hypothetically the blocks 322a, 323a, the "execution date" of the blocks 322a, 323a may differ from the blocks 322, 323, but the contents of the other items in the blocks 322a, 323a will match those of blocks 322, 323.

In this case, for the handling consent records of disclosure for which a corresponding audit record exists, it is desirable for the using party A to make confirmation using the block 322a in step A108 of FIG. 4 and for the using party B to make confirmation using the block 323a in step A112 of FIG. 4.

Similarly, with regard to step S202 (see FIG. 12) in Verification Example 2 of the first embodiment, a variation that uses an audit record instead of an acquisition background record is illustrated below as step S202'.

Step S202'

The searcher 112 searches for a handling consent record of disclosure and an audit record related to the handling execution record of receipt to be verified. With this step, the blocks 303 and 322 are acquired (see FIG. 11). The block 303 is referenced by the handling execution record of receipt. The block 322 references the block 303 as the disclosure consent ID. If either one of the handling consent record or the audit record does not exist on the blockchain, the processor 113 detects an inconsistency (S210). Alternatively, it is also possible for the processor 113 to detect an inconsistency if neither the handling consent record nor the audit record exists on the blockchain, and not detect an inconsistency if either one of the handling consent record or the audit record exists.

In step S102 (see FIG. 10) in Verification Example 1 of the first embodiment, a search for an acquisition background record is performed, and in step S103, the corresponding handling consent record of acquisition is used. This is because Verification Example 1 assumes that the verifying party can access the using party identifier correspondence table. The same applies to Verification Example 3. On the other hand, Verification Example 2 assumes that the verifying party cannot access the using party identifier correspondence table, and therefore verification using the corresponding handling consent record of acquisition is unavailable. Accordingly, the existence of a corresponding handling consent record of acquisition is confirmed with an audit record.

In the example illustrated in FIG. 6, an audit record is generated for each disclosure consent, like the blocks 322 to 325.

FIG. 19 is a diagram illustrating variations of an audit record. A combined audit record may be generated for a plurality of disclosure consents, like the blocks 326, 327, and 328. In combining consents, all disclosure consents with handling consent within a certain period may be combined (block 326), or disclosure consents with handling consent may be combined for each recipient (blocks 327, 328). However, it is desirable to avoid combining consents for each data-related party, as this could lead to the leaking of the correspondence table.

An audit record may be generated as a "yes" handling consent exists, may be generated as a "no" when handling consent does not exist, or may be generated in both cases. Alternatively, an audit record may be generated when handling exists and not generated when handling consent does not exist. Alternatively, an audit record may not be generated when handling exists and generated when handling consent does not exist.

According to the present embodiment above, by using an audit record, various records can be saved to the first storage system while preventing the leaking of the relationship between a related party such as an individual and a third party (using party, first business operator), that is, the relationship indicated by the identifier correspondence table. Furthermore, the audit record can be used to verify that the using party has the legitimate consent of the related party with regard to the handling of data.

Third Embodiment: Consistency Verification of Audit Record and Log

It is also conceivable for the verification/audit apparatus 1 to verify the consistency of an audit record by the auditor with respect to a log. When the apparatus of the auditor (in this example, the verification/audit apparatus 1) accesses the first storage system 201 via the data management apparatus 101, a communication log, authentication log, or both pertaining to the auditor are saved in the second storage system 601. In this case, the verification/audit apparatus 1 corresponds to a first apparatus that generates an audit record including the identifier of the auditor, and the data management apparatus 101 corresponds to a second apparatus that receives and writes the audit record to the first storage system 201. Thus, a similar consistency verification is possible with respect to a communication log or an authentication log pertaining to the auditor. However, even if the verification/audit apparatus 1 accesses the first storage system 201 without going through the data management apparatus 101, a similar consistency verification is possible with respect to a communication log or an authentication log pertaining to the auditor, insofar as the communication log or the authentication log can be acquired.

Verification Example 4-3': Verification of Audit Records and Communication Log The verification/audit apparatus 1 verifies the consistency of audit records for each auditor and a communication log. Regarding the operations by the verification/audit apparatus in Verification Example 4-3', step S308 (see FIG. 15) in Verification Example 4-3 is also applied in a similar way to Verification Example 4-3'. The operations corresponding to steps S301, S303, S305, S306, and S307 are different from Verification Example 4-3, and are changed to the following steps S301', S303', S305', S306', and S307'. Steps S302 and S304 are unnecessary. Step S308 is the same as in Verification Example 4-3.

Step S301': The verification/audit apparatus 1 receives a consistency verification request regarding the BC user ID of the auditor.

Step S302: Unnecessary.

Step S303': The verification/audit apparatus 1 acquires, from the first storage system 201, the transaction IDs (consent information identifiers) of audit records including the BC user ID.

Step S304: Unnecessary.

Step S305': The verification/audit apparatus 1 verifies the consistency of the handling consent (records related to consent) and the audit records. For example, there is the method indicated in the second embodiment. The method of verification is not limited to a particular method.

Step S306': The verification/audit apparatus 1 acquires, from the second storage system 601, a communication log related to the BC user ID of the auditor.

Step S307': The verification/audit apparatus 1 verifies the consistency of the audit records indicated by the transaction IDs acquired in step S303' and the communication log. An inconsistency (lack of consistency) is detected if at least one of a record-based verification and a log-based verification lacks consistency.

The following specifically illustrates an example of the operations in each step. The following assumes that the verification/audit apparatus 1 accesses the first storage system 201 not directly but via the processing business operator to be verified (in the present embodiment, the data management apparatus 101 of the data-handling business operator). In the present embodiment, the verification/audit apparatus 1 doubles as the auditor apparatus, but the auditor apparatus may also be a separate apparatus from the verification/audit apparatus 1. The apparatus (in the present embodiment, the data management apparatus 101) of the processing business operator holds a communication log corresponding to the audit record, and the receiving party that receives the audit record is the apparatus (in the present embodiment, the data management apparatus 101) of the processing business operator.

Step S301': The verification/audit apparatus 1 receives a consistency verification request regarding a BC user ID (auditor1).

Step S303': The verification/audit apparatus 1 acquires, from the first storage system 201, the transaction IDs 200, 201, 202, 203 (see FIG. 6) of audit records including the BC user ID (auditor1).

Step S305': This step is similar to the second embodiment and therefore omitted here.

Step S306': The verification/audit apparatus 1 acquires, from the second storage system 601, a communication log related to the BC user ID (auditor1). The verification/audit apparatus 1 is assumed to acquire only a communication log of the reception of audit records, and acquires the eighth to eleventh rows of the communication log in FIG. 17.

Step S307': The verification/audit apparatus 1 verifies the consistency of the relevant audit records and the communication log. In the record-based verification, the verification/audit apparatus 1 determines that the eighth row of the communication log corresponds to the transaction ID 200, the ninth row of the communication log corresponds to the transaction ID 201, the tenth row of the communication log corresponds to the transaction ID 202, and the eleventh row of the communication log corresponds to the transaction ID 203. No inconsistency is detected in the record-based verification.

In the log-based verification, the transaction ID 200 corresponds to the eighth row of the communication log, the transaction ID 201 corresponds to the ninth row of the communication log, the transaction ID 202 corresponds to the tenth row of the communication log, and the transaction ID 203 corresponds to the eleventh row of the communication log. No inconsistency is detected in the log-based verification.

Therefore, the verification/audit apparatus 1 determines that no inconsistency is detected between the audit records and the communication log.

Step S308: This step is similar to Verification Example 4-1 and therefore omitted here.

Verification Example 4-4': verification of audit records and authentication log The verification/audit apparatus 1 verifies the consistency of audit records for each auditor and an authentication log. Regarding the operations by the verification/audit apparatus in Verification Example 4-4', steps S301' to S305' and S308 in Verification Example 4-3' are also applied in a similar way to Verification Example 4-4'. The operations corresponding to steps S306' and S307' are different from Verification Example 4-3', and are changed to the following steps S306" and S307".

Step S306": The verification/audit apparatus 1 acquires, from the second storage system 601, an authentication log related to the BC user ID of the auditor.

Step S307": The verification/audit apparatus 1 verifies the consistency of the audit records indicated by the transaction IDs acquired in step S303' and the authentication log.

The following specifically illustrates an example of the operations in each step. The following assumes that the verification/audit apparatus 1 accesses the first storage system 201 not directly but via the apparatus (for example, the data management apparatus 101) of the processing business operator to be verified. Consequently, an authentication log corresponding to the audit records is held by the apparatus (for example, the data management apparatus 101) of the processing business operator.

Steps S301' to S305': These steps are similar to Verification Example 4-3' and therefore omitted here.

Step S306": The verification/audit apparatus 1 acquires, from the second storage system 601, an authentication log related to the BC user ID (auditor1).

The verification/audit apparatus 1 is assumed to acquire only an authentication log pertaining to the auditor, and acquires the fifth row of the authentication log 4-4 in FIG. 18.

Step S307": The verification/audit apparatus 1 verifies the consistency of the relevant audit records and the authentication log. In the record-based verification, the fifth row of the authentication log corresponds to the transaction ID 200, the fifth row of the authentication log corresponds to the transaction ID 201, the fifth row of the authentication log corresponds to the transaction ID 202, and the fifth row of the authentication log corresponds to the transaction ID 203. No inconsistency is detected in the record-based verification.

Therefore, the verification/audit apparatus 1 determines that no inconsistency is detected between the audit records and the authentication log Step S308: This step is similar to Verification Example 4-1 and therefore omitted here.

In the present embodiment, a communication log and an authentication log are used as logs of operations related to the generation of audit records, but it is also possible to use another log. For example, if the verification/audit apparatus 1 can write audit records to the first storage system 201 directly, it is also possible to use an access log.

According to the present embodiment above, it is possible to verify the consistency of audit records by using a log (communication log, authentication log, or the like) of operations performed in relation to the generation of audit records.

Hardware Configuration

FIG. 21 illustrates a hardware configuration of the verification/audit apparatus 1 (information processing apparatus) according to each embodiment. The data management apparatus 101, the related party apparatus 501 and the using party apparatus 701 have also the similar hardware configuration. The verification/audit apparatus 1 is configured as a computer device 900. The computer device 900 includes a CPU 901, an input interface 902, a display device 903, a communication device 904, a main storage device 905, and an external storage device 906, and these components are mutually connected through a bus 907.

The CPU (central processing unit) 901 executes an information processing program as a computer program on the main storage device 905. The information processing program is a computer program configured to achieve each above-described functional composition of the present device. The information processing program may be achieved by a combination of a plurality of computer programs and scripts instead of one computer program. Each functional composition is achieved as the CPU 901 executes the information processing program.

The input interface 902 is a circuit for inputting, to the present device, an operation signal from an input device such as a keyboard, a mouse, or a touch panel. The input interface 902 corresponds to the input device in each embodiment. The input interface 902 is circuitry for inputting operation signals from the input device to the verification/audit device 1.

The display device 903 displays data output from the present device. The display device 903 is, for example, a liquid crystal display (LCD), an organic electroluminescence display, a cathode-ray tube (CRT), or a plasma display (PDP) but is not limited thereto. Data output from the computer device 900 can be displayed on the display device 903. The display device 903 corresponds to the output device in each embodiment.

The communication device 904 is a circuit for the present device to communicate with an external device in a wireless or wired manner. Data can be input from the external device through the communication device 904. The data input from the external device can be stored in the main storage device 905 or the external storage device 906.

The main storage device 905 stores, for example, the information processing program, data necessary for execution of the information processing program, and data generated through execution of the information processing program. The information processing program is loaded and executed on the main storage device 905. The main storage device 905 is, for example, a RAM, a DRAM, or an SRAM but is not limited thereto. Each storage or database in the verification/audit device 1 in each embodiment may be implemented on the main storage device 905.

The external storage device 906 stores, for example, the information processing program, data necessary for execution of the information processing program, and data generated through execution of the information processing program. The information processing program and the data are read onto the main storage device 905 at execution of the information processing program. The external storage device 906 is, for example, a hard disk, an optical disk, a flash memory, or a magnetic tape but is not limited thereto. Each storage or database in the verification/audit device 1 in each embodiment may be implemented on the external storage device 906.

The information processing program may be installed on the computer device 900 in advance or may be stored in a storage medium such as a CD-ROM. Moreover, the information processing program in each embodiment may be uploaded on the Internet.

The present device may be configured as a single computer device 900 or may be configured as a system including a plurality of mutually connected computer devices 900.

While certain embodiment have been described, these embodiment have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus comprising:
a processing circuitry configured to
specify, from a first storage system storing records relating to at least one of (i) handling of data of a related party and (ii) consent to the handling of the data,
a first consent record including
(a) a first business-operator-specific identifier, which identifies the related party and which is assigned exclusively to the first business operator, and
(b) consent of the related party allowing the first business operator to execute a first handling of the data of the related party, and
detect a related party identifier corresponding to the first business-operator-specific identifier included in the first consent record, on the basis of correspondence data in which a related party identifier identifying the related party and having a different value from the first business-operator-specific identifier is associated with the first business-operator-specific identifier; and
a searching circuitry configured to search the first storage system, on the basis of the detected related party identifier, to retrieve a second consent record including consent of the related party allowing a second business operator to execute a second handling of the data of the related party, wherein
the first handling and the second handling have a relationship such that the first business operator is allowed to perform the first handling of the data only after the second business operator executes the second handling of the data, the processing circuitry is configured to generate, on the basis of presence or absence of the second consent record, an audit record including a record identifier of the first consent record and including information indicating whether the second consent record exists or does not exist, the generated audit record is stored in the first storage system,
an audit record including information indicating that the second consent record exists means that the first handling by the first business operator is in a state of being allowed on condition that the second handling has been executed by the second business operator, and
an audit record including information indicating that the second consent record does not exist means that, in a situation where the second handling by the second business operator is not allowed, execution of the first handling by the first business operator results in an inconsistency.

2. The information processing apparatus according to claim 1, wherein when the second consent record is detected, the processing circuitry is configured to generate the audit record including the record identifier of the first consent record and information indicating that the second consent record exists.

3. The information processing apparatus according to claim 1, wherein when the second consent record is not detected, the processing circuitry is configured to generate the audit record including the record identifier of the first consent record and information indicating that the second consent record does not exist.

4. The information processing apparatus according to claim 1, wherein the first handling includes the first business operator receiving or acquiring the data from the second business operator.

5. The information processing apparatus according to claim 4, wherein the second handling includes the second business operator receiving or acquiring the data from the related party.

6. The information processing apparatus according to claim 1, wherein the first business-operator-specific identifier is assigned to a plurality of first business operators and a different value of the first business-operator-specific identifier is assigned to each of the plurality of first business operators.

7. The information processing apparatus according to claim 1, further comprising:
a receiving circuitry configured to receive a verification request regarding the consistency of a handling execution record indicating that the first business operator executes the first handling of the data, wherein
the searching circuitry is configured to search the first storage system for the handling execution record on the basis of the verification request,
the processing circuitry is configured to acquire, from the handling execution record, an identifier of a first consent record that includes consent by the related party allowing the first business operator to execute the first handling,
the searching circuitry is configured to
retrieve, from the first storage system, the first consent record on the basis of the identifier of the first consent record and
retrieve, from the first storage system, an audit record including the identifier of the first consent record and information indicating the presence or absence of the second consent record, and the processing circuitry is configured to verify the consistency of the handling execution record on the basis of the first consent record and the audit record.

8. The information processing apparatus according to claim 7, wherein the processing circuitry is configured to detect an inconsistency of the handling execution record when at least one of either the first consent record or the audit record including information indicating that the second consent record exists is not detected.

9. The information processing apparatus according to claim 7, wherein the processing circuitry is configured to detect an inconsistency of the handling execution record when the first consent record and the audit record including information indicating that the second consent record does not exist are not detected.

10. The information processing apparatus according to claim 1, wherein
the audit record includes an identifier of an auditor,
the information processing apparatus further comprises a receiving circuitry is configured to receive a verification request regarding the consistency of the audit record including the identifier of the auditor,
the processing circuitry is configured to
acquire, from a second storage system in which a log of operations performed in relation to the generation of the audit record is stored in association with the identifier of the auditor, the log associated with the identifier of the auditor, and
verify the consistency of the audit record on the basis of the log.

11. The information processing apparatus according to claim 10, wherein
the second storage system stores the log of communication related to the audit record, the communication performed between a first apparatus that generates the audit record including the identifier of the auditor and a second apparatus that receives and writes the audit record to the first storage system, and
the processing circuitry is configured to verify the consistency of the audit record on the basis of whether or not the reception of the audit record including the identifier of the auditor is included in the log of communication.

12. The information processing apparatus according to claim 10, wherein
the second storage system stores the log of communication related to the audit record, the communication being performed between a first apparatus that generates the audit record including the identifier of the auditor and a second apparatus that receives and writes the audit record to the first storage system,
the searching circuitry is configured to search the first storage system for the audit record including the identifier of the auditor associated with the log of communication, and
the processing circuitry is configured to verify the consistency of the audit record according to a result of the search for the audit record.

13. The information processing apparatus according to claim 10, wherein
the second storage system stores the log of a result of an authentication process for authenticating the auditor performed by a third apparatus that stores the audit record in the first storage system when the authentication process is successful, and the processing circuitry is configured to verify the consistency of the audit record according to whether successful authentication of the auditor is included in the log.

14. The information processing apparatus according to claim 1, wherein the processing circuitry is configured to transmit a request for writing the audit record to the first storage system to an apparatus that writes records to the first storage system.

15. The information processing apparatus according to claim 1, wherein the first storage system is a blockchain.

16. An information processing method comprising:
specifying, from a first storage system storing records relating to at least one of (i) handling of data of a related party and (ii) consent to the handling of the data,
a first consent record including
(a) a first business-operator-specific identifier, which identifies the related party and which is assigned exclusively to the first business operator, and
(b) consent of the related party allowing the first business operator to execute a first handling of the data of the related party,
detecting a related party identifier corresponding to the first business-operator-specific identifier included in the first consent record, on the basis of correspondence data in which a related party identifier identifying the related party and having a different value from the first business-operator-specific identifier is associated with the first business-operator-specific identifier,
searching the first storage system, on the basis of the related party identifier, to retrieve a second consent record including consent of the related party allowing a second business operator to execute a second handling of the data of the related party, wherein the first handling and the second handling have a relationship such that the first business operator is allowed to perform the first handling of the data only after the second business operator executes the second handling of the data, and
generating, on the basis of presence or absence of the second consent record, an audit record including a record identifier of the first consent record and information indicating whether the second consent record exists or does not exist, the generated audit record is stored in the first storage system, wherein
an audit record including information indicating that the second consent record exists means that the first handling by the first business operator is in a state of being allowed on condition that the second handling has been executed by the second business operator, and
an audit record including information indicating that the second consent record does not exist means that, in a situation where the second handling by the second business operator is not allowed, execution of the first handling by the first business operator results in an inconsistency.

17. A non-transitory computer readable medium having a computer program stored therein which causes a computer to perform processes comprising:
specifying, from a first storage system storing records relating to at least one of (i) handling of data of a related party and (ii) consent to the handling of the data,
a first consent record including
(a) a first business-operator-specific identifier, which identifies the related party and which is assigned exclusively to the first business operator, and (b) consent of the related party allowing the first business operator to execute a first handling of the data of the related party, detecting a related party identifier corresponding to the first business-operator-specific identifier included in the first consent record, on the basis of correspondence data in which a related party identifier identifying the related party and having a different value from the first business-operator-specific identifier is associated with the first business-operator-specific identifier, searching the first storage system, on the basis of the detected related party identifier, to retrieve a second consent record including consent of the related party allowing a second business operator to execute a second handling of the data of the related party, wherein the first handling and the second handling have a relationship such that the first business operator is allowed to perform the first handling of the data only after the second business operator executes the second handling of the data, and generating, on the basis of presence or absence of the second consent record, an audit record including a record identifier of the first consent record and information indicating whether the second consent record exists or does not exist, the generated audit record is stored in the first storage system, wherein an audit record including information indicating that the second consent record exists means that the first handling by the first business operator is in a state of being allowed on condition that the second handling has been executed by the second business operator, an audit record including information indicating that the second consent record does not exist means that, in a situation where the second handling by the second business operator is not allowed, execution of the first handling by the first business operator results in an inconsistency.

\* \* \* \* \*